US007128237B2

(12) United States Patent
Holdway et al.

(10) Patent No.: US 7,128,237 B2
(45) Date of Patent: Oct. 31, 2006

(54) CLEAR DOOR VENDING MACHINE

(76) Inventors: John Holdway, c/o Royal Vendors, 201 Industrial Blvd., Kearneysville, WV (US) 25430; Brian Halterman, c/o Royal Vendors, 201 Industrial Blvd., Kearneysville, WV (US) 25430; Mike Ring, c/o Royal Vendors, 201 Industrial Blvd., Kearneysville, WV (US) 25430

( * ) Notice: Subject to any disclaimer, the term of this patent is extended or adjusted under 35 U.S.C. 154(b) by 0 days.

(21) Appl. No.: 11/394,323

(22) Filed: Mar. 31, 2006

(65) Prior Publication Data

US 2006/0169713 A1 Aug. 3, 2006

Related U.S. Application Data

(62) Division of application No. 10/670,776, filed on Sep. 26, 2003.

(51) Int. Cl.
*B65G 59/00* (2006.01)
*B65H 3/44* (2006.01)
*G07F 11/00* (2006.01)

(52) U.S. Cl. ...................... 221/127; 221/123; 221/130; 221/131; 221/132; 221/133

(58) Field of Classification Search ................ 221/155, 221/123, 130, 131, 226, 230, 274, 293, 126, 221/127
See application file for complete search history.

(56) References Cited

U.S. PATENT DOCUMENTS

| | | | |
|---|---|---|---|
| 3,348,732 | A | 10/1967 | Schwartz |
| 4,108,333 | A | 8/1978 | Falk et al. |
| 4,252,250 | A | 2/1981 | Toth |
| 4,483,459 | A | 11/1984 | Taylor et al. |
| 4,560,088 | A | 12/1985 | Tan |
| 4,687,119 | A | 8/1987 | Juillet |
| 4,717,044 | A | 1/1988 | Suzuki et al. |
| 4,762,250 | A | 8/1988 | Friberg |
| 4,768,680 | A | 9/1988 | Mehlan et al. |
| 4,812,629 | A | 3/1989 | O'Neil et al. |
| 4,986,441 | A | 1/1991 | Kanbe et al. |
| 5,048,719 | A | 9/1991 | Empl et al. |

(Continued)

OTHER PUBLICATIONS

Brochure, Glass Front Vender by Maytag, manufactured by Dixi-Narco (no date).

*Primary Examiner*—Gene O. Crawford
*Assistant Examiner*—Timothy Waggoner
(74) *Attorney, Agent, or Firm*—Jacobson Holman PLLC

(57) ABSTRACT

Vending machine product is moved by an "X-Y mechanism" having two stationary electronically controlled drive "motors," which drive tension elements that position horizontally and vertically sliding components. A separation and selection system uses a "rotator" to release a product from a tray and a "gate" to separate the products into two columns on the tray. A "lever" mechanically links these components. Products move off the tray by a spring powered "slider" on the tray. There is only one "rotator-gate-lever" mechanism per pair of product columns in each display tray. When a "cup" engages the "lever" moving to the right, a product from the left side of the display tray is pushed into the "cup" and vice versa. Adjustable side walls in each tray accommodate different sized packages. The delivery mechanism uses the "cup" for transport. A lower surface of the cup engages a sliding "door" to a balanced delivery "port" for delivery of product from the cup to the port. Delivery is made from the cup to the port simultaneously with the opening of the door.

13 Claims, 31 Drawing Sheets

U.S. PATENT DOCUMENTS

| | | | | | |
|---|---|---|---|---|---|
| 5,105,978 | A | | 4/1992 | Trouteaud et al. | |
| 5,121,854 | A | | 6/1992 | Trouteaud et al. | |
| 5,520,941 | A | | 5/1996 | Oosterling | |
| 5,570,811 | A | * | 11/1996 | Wittern et al. | 221/127 |
| RE35,743 | E | | 3/1998 | Pearson | |
| 5,881,911 | A | | 3/1999 | Burdette et al. | |
| 5,901,877 | A | | 5/1999 | Fujiu | |
| 6,047,855 | A | | 4/2000 | Lin | |
| 6,098,841 | A | | 8/2000 | Katakai | |
| 6,149,031 | A | | 11/2000 | Bauman et al. | |
| 6,170,702 | B1 | | 1/2001 | Zettler et al. | |
| 6,199,720 | B1 | | 3/2001 | Rudick et al. | |
| 6,230,930 | B1 | | 5/2001 | Sorensen et al. | |
| 6,247,610 | B1 | | 6/2001 | Ziesel et al. | |
| 6,253,954 | B1 | * | 7/2001 | Yasaka | 221/93 |
| 6,283,324 | B1 | | 9/2001 | Jenkins et al. | |
| 6,286,715 | B1 | | 9/2001 | Ziesel et al. | |
| 6,328,180 | B1 | * | 12/2001 | Sorensen et al. | 221/131 |
| 6,340,095 | B1 | | 1/2002 | Walter | |
| 6,352,174 | B1 | | 3/2002 | Bauman et al. | |
| 6,357,621 | B1 | | 3/2002 | Guindulain Vidondo | |
| 6,409,045 | B1 | | 6/2002 | Lauer | |
| 6,415,950 | B1 | | 7/2002 | Robrechts | |
| 6,464,104 | B1 | | 10/2002 | Waddell | |
| 6,499,627 | B1 | | 12/2002 | Arai | |
| 6,505,755 | B1 | | 1/2003 | Voss | |
| 6,513,677 | B1 | | 2/2003 | Sorensen et al. | |
| 6,682,289 | B1 | | 1/2004 | Credle, Jr. | |
| 6,755,322 | B1 | | 6/2004 | Herzog et al. | |
| 6,868,983 | B1 | | 3/2005 | Chirnomas | |
| 2001/0000609 | A1 | | 5/2001 | Rudick et al. | |
| 2001/0000610 | A1 | | 5/2001 | Johnson | |
| 2001/0048000 | A1 | | 12/2001 | Arai | |
| 2003/0006241 | A1 | | 1/2003 | Johnson | |
| 2003/0034354 | A1 | | 2/2003 | Chimomas | |

* cited by examiner

CLEAR DOOR VENDING MACHINE

CROSS-REFERENCE TO RELATED APPLICATIONS

The present patent application is a division of application Ser. No. 10/670,776, filed Sep. 26, 2003, which is incorporated herein by reference in its entirety.

BACKGROUND OF THE INVENTION

1. Field of the Invention

The present invention relates to a clear door vending machine having a product separation and selection tray system, a fixed motor X-Y axis product acquisition and transport system and a controlled delivery of product system.

2. Related Art

Although the 1880s are usually considered the dawn of the vending machine era, vending machines have existed for a couple of thousand years. The earliest reference to a vending machine was made by a Greek mathematician, who described and illustrated a coin-operated device used for vending sacrificial water in Egyptian temples. The machine was completely automatic, set in operation by insertion of a five-drachma coin.

More recent times have seen a vast proliferation of vending machines for all types and sizes of products. These machines have become ubiquitous on the American landscape, primarily dispensing snacks and drinks.

A common problem encountered during the use of these machines is the absence of a particular desired product. In machines where the product is concealed behind a display panel, it is difficult to determine a product's availability. Although visual displays may indicate "sold out" or "choose another product," these messages often go unheeded.

One step to avoid this problem is the use of clear panel or door vending machines, where the machine's content is visually accessible. Entry of a particular product's code into a digital keypad, typically based upon the column (letter) and row (number) of a product, results in dispensing of the product into a bottom trough, after the product dramatically drops over great distances. This may be acceptable for dispensing snacks, but could have disastrous results for dispensing of glass encased liquids or carbonated beverages.

An X-Y drive mechanism is used in conventional clear panel or door vending machines to pick up a product from a particular row and column and transport the product to a delivery point with minimal gravitational deployment. A drive motor is typically provided for each axis of movement. The drive motor for one axis can remain stationary while the motor for the other axis is movable with the selection assembly.

One problem encountered by the use of such a selection assembly is that the power and control wiring to a movable motor is difficult to route inside of a vending machine in a safe and controlled manner. It would be beneficial to have both motors and their respective wiring stationary so as to avoid this problem.

In a conventional vending machine shelf mechanism, the products are separated and dispensed from their shelves by active electronic devices such as driven push bars or rotating corkscrews. These devices are typically require use of motors and/or solenoids having extensive wiring requirements for both power and control of the operation.

A problem encountered in the use of such a dispensing assembly is that many relatively expensive devices are required and often difficult wiring issues arise. It is desired to eliminate all electronic devices and wiring from the product dispensing shelves.

In a conventional vending machine, products are often dropped a considerable distance before delivery to the consumer. Also, products are often delivered such that a consumer can reach with their hands for the product before the delivery cycle is complete. There is the potential for damage to the product, the mechanism or harm to the consumer. It is desired that the product be delivered in the most controlled manner possible so as to protect the consumer and the machine.

In a conventional vending machine, it is common practice to accommodate different sized packages with inserts, shims, or other attachments. The problem with this approach is the necessity to make, supply, insert and maintain these "loose" extra parts. It is desired to make the machine adjustable to accommodate different sized packages for quick refill so that the consumer always has a wide variety of choices of vended product.

SUMMARY OF THE INVENTION

Accordingly, it is an object of the present invention to provide an X-Y axis product acquisition and transport system in a clear panel vending machine without translating motors or requiring wiring exposed to movement of motors.

It is another object of the present invention to provide a product separation and selection tray system without the use of multiple, dedicated electronic devices or wiring exposed to the environment of a vending machine.

It is still another object of the present invention to provide quick and easy controlled delivery of products without agitation during delivery of the product or contact with the consumer until after the dispensing cycle is complete.

It is yet another object of the present invention to provide quick adjustment to a display tray of a clear panel vending machine to accommodate different sized packages.

These objects are accomplished by the use of an "X-Y mechanism" having two stationary electronically controlled drive "motors". These motors drive (directly or indirectly) tension elements (belt, chain, cable, etc.) that position horizontally and vertically sliding components.

The separation and selection system of the present invention uses a "rotator" to release a product from a tray and a "gate" to separate the products into two columns on the tray. A "lever" (centered by two springs) mechanically links these components. Products move off the tray with a spring powered "slider" (one slider for each product column) on the tray.

An important feature of the present invention is that there is only one "rotator-gate-lever" mechanism per pair of product columns in each display tray. That is, when a "cup" engages the "lever" while moving right, a product from the left side of the display tray is pushed into the "cup" and vice versa. Adjustable side walls in each tray accommodate different sized packages.

The delivery mechanism uses the "cup" for transport. A lower surface of the cup engages a sliding "door" to a balanced delivery "port" for delivery of product from the cup to the port. Delivery is made from the cup to the port simultaneously with the opening of the door to the port.

During operation of the present invention, the drive motors position the X-Y mechanism to place the cup at the appropriate product location in front of the appropriate tray. Control of the X-Y mechanism is based upon information input to digital keys of a keypad on the front of the vending machine or by any other known mechanism. Stationary drive motors position the cup by X-axis and Y-axis movement controlled by drive belts so that the cup engages a lever of the supply tray. Movement of the lever thereby rotates a rotator and gate to allow a slider to mechanically push product into the cup under spring bias force. The motors then move the cup through X-axis and Y-axis movement to a position above a slidable door.

The door is movable against a bias force to gain access to a delivery port. The downward movement of the cup slides the port door open against a bias force while simultaneously tilting the cup to an angle greater than approximately 45° or to an angle necessary for the product to slide from the cup. The tilting of the cup forces the product through the port door into the delivery port.

The delivery port pivots outwardly only when dispensed product is received, making the product available to the consumer. The delivery port may not be tilted out of the plane of the front of the vending machine when the door to the delivery port starts to open. This prevents customer access to the delivery door prior to purchasing a product. Such a feature provides customer protection for engagement with a falling dispensed product until delivery is complete and is also a tamperproof feature to prevent access to the interior of the machine when unauthorized attempts are made to gain access to the machine for illicit purposes.

The present invention provides for the vending of products with all electronically controlled power provided by two stationary motors. There are no moving wire harnesses. There are no sensors, solenoids, motors, wires or other electronic devices on the product shelves.

The shelf or tray mechanisms have minimal moving components. In addition, the products are not subject to excessive agitation during vending. The consumer is thereby also protected from moving components or products.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 2 is a front perspective view of the product separation and selection tray system of the present invention.

FIG. 3 is a rear perspective view of the product separation and selection tray system.

FIG. 4 is a side view of the product separation and selection tray system.

FIG. 5 is a bottom view of the product separation and selection tray system.

FIG. 6 is an exploded front perspective view of the product separation and selection tray system.

FIG. 7 is a front view of the product separation and selection tray system.

FIG. 8 is a rear view of the product separation and selection tray system.

FIG. 9 is a top plan view of the product separation and selection tray system.

DETAILED DESCRIPTION OF THE PREFERRED EMBODIMENTS

Figure 1:
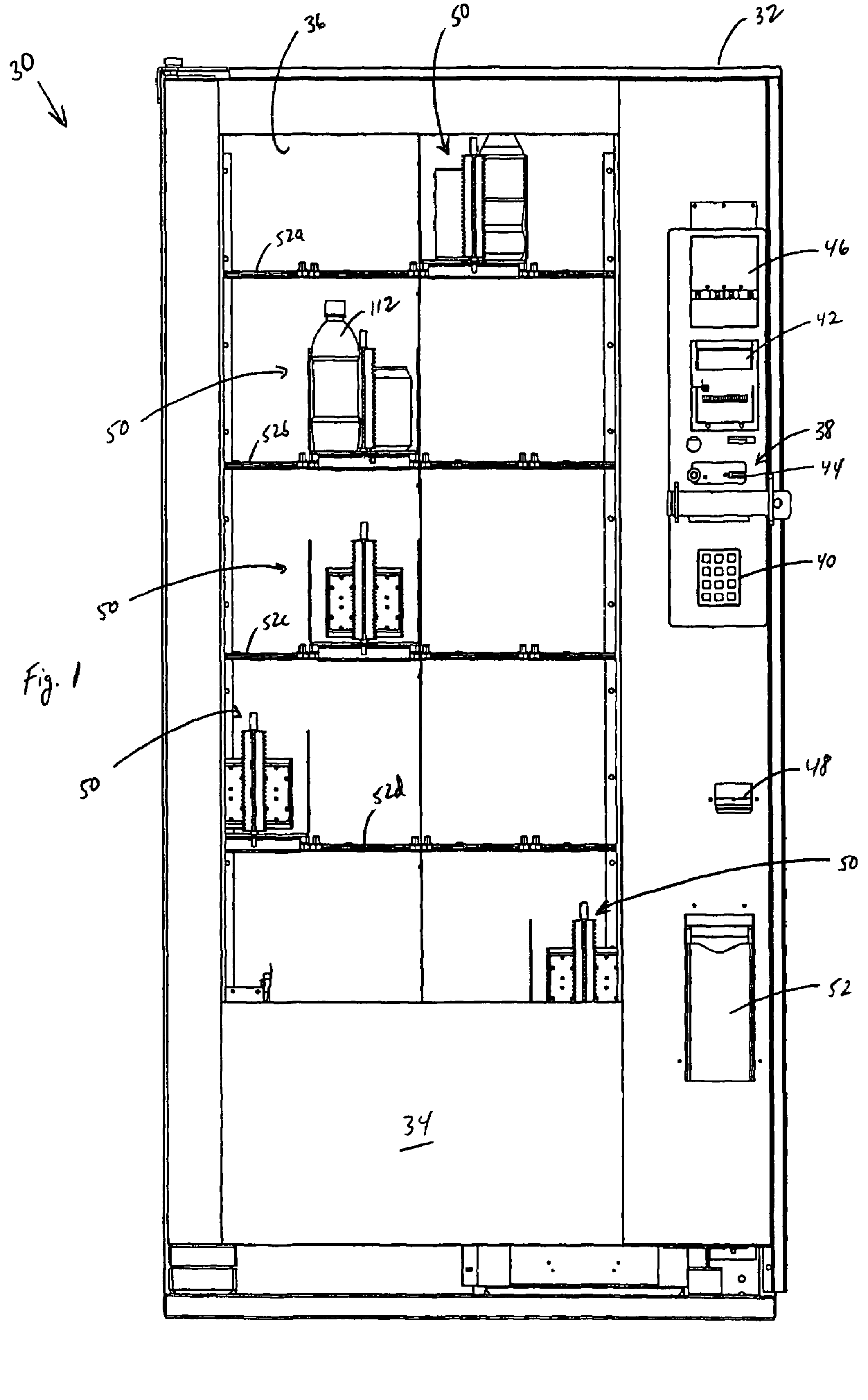
FIG. 1 is a front view of a clear door vending machine embodying the teachings of the subject invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIG. 1 in particular, a clear door vending machine embodying the teachings of the subject invention is generally designated as 30. With reference to its orientation in FIG. 1, the clear door vending machine includes a cabinet 32 with a front door 34 having a clear panel portion 36.

On the front face of the door 34 is located a control panel 38 having a digital keypad 40. Information entered into the digital keypad is displayed in display panel 42. In addition, the control panel 38 includes coin slot 44 and dollar bill receiver 46, as well as a change return slot 48.

Representative samples of product separation and selection tray systems 50 for dispensing product through a delivery port 52 are seen through the panel 36. A random scattering of the product separation and selection tray systems 50 is shown in FIG. 1, it being understood that each of the shelves 52*a*, 52*b*, 52*c*, 52*d* and shelf 52*e* (not shown) can accommodate up to four systems 50 on each shelf in the present width configuration of the systems 50. The sidewalls of each system 50 are movable laterally to accommodate smaller or larger sized product to be dispensed by the vending machine 30 of the present invention.

Figure 2:
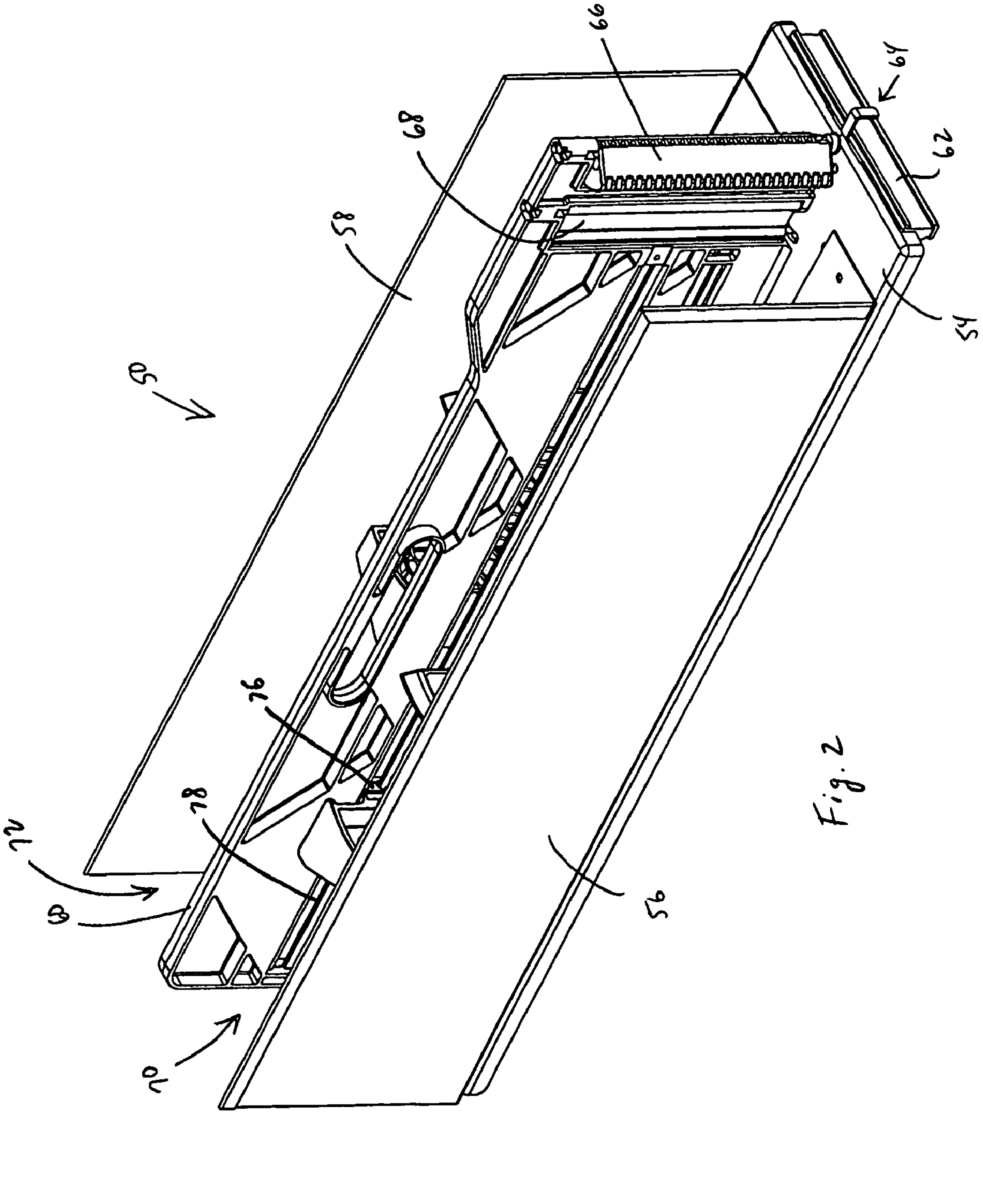
FIGS. 2 through 9 relate to the product separation and selection tray system which is adjustable and removable from the clear door vending machine.
Figure 3:
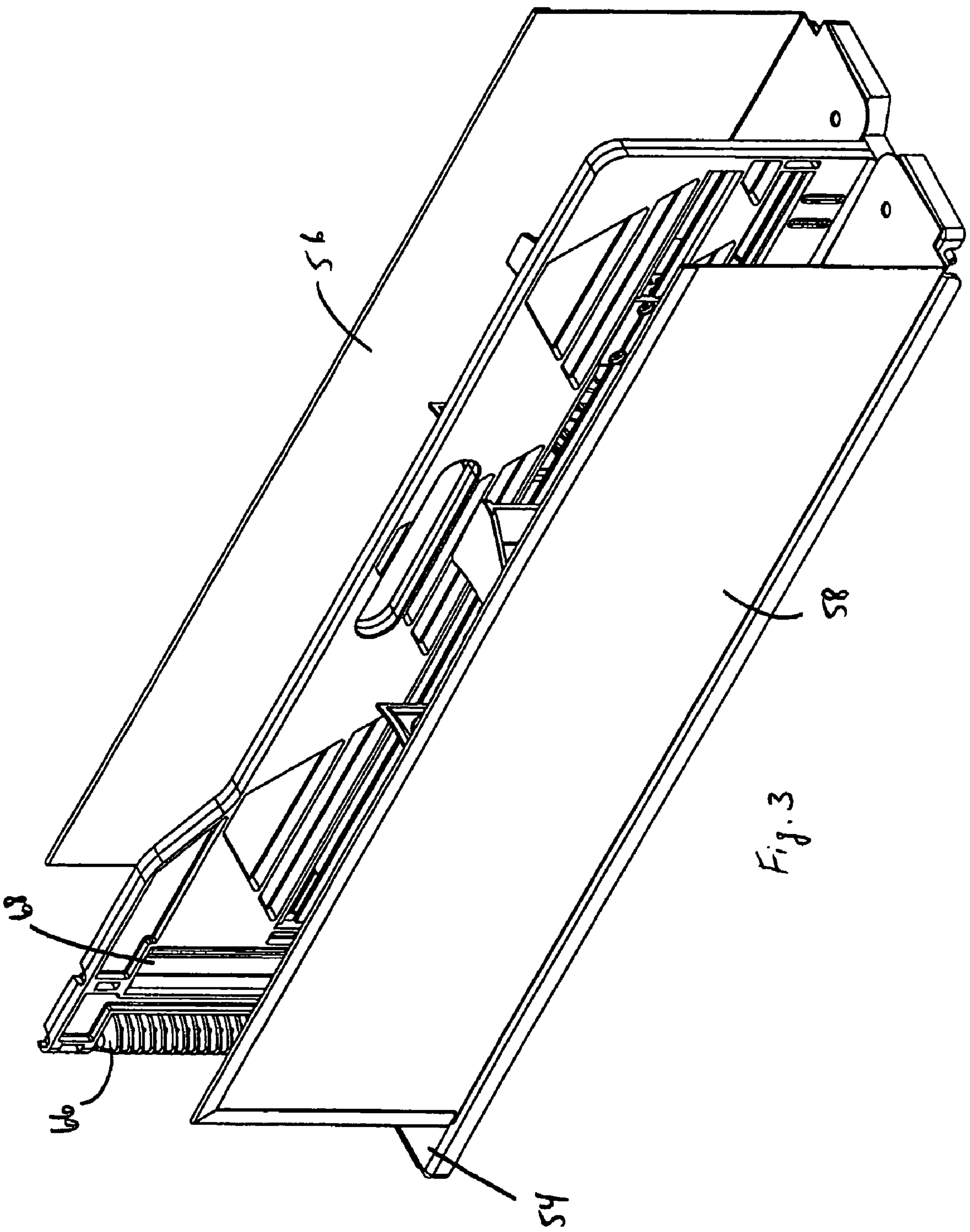
Figure 4:
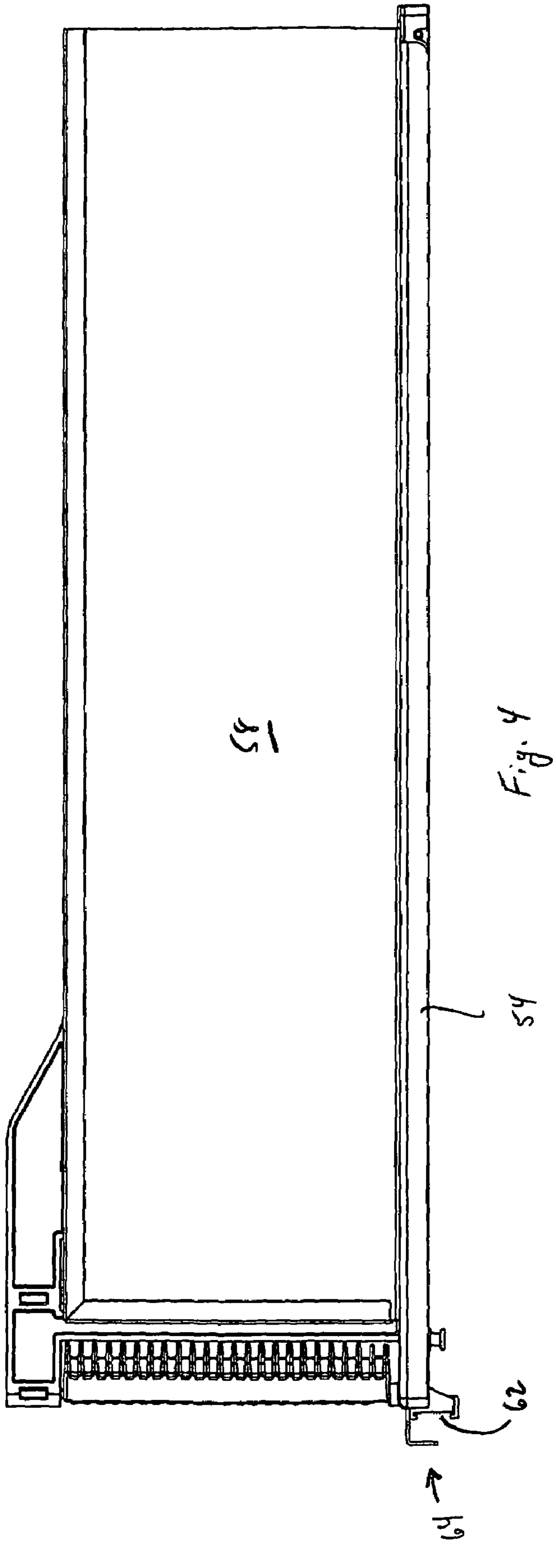
Figure 5:
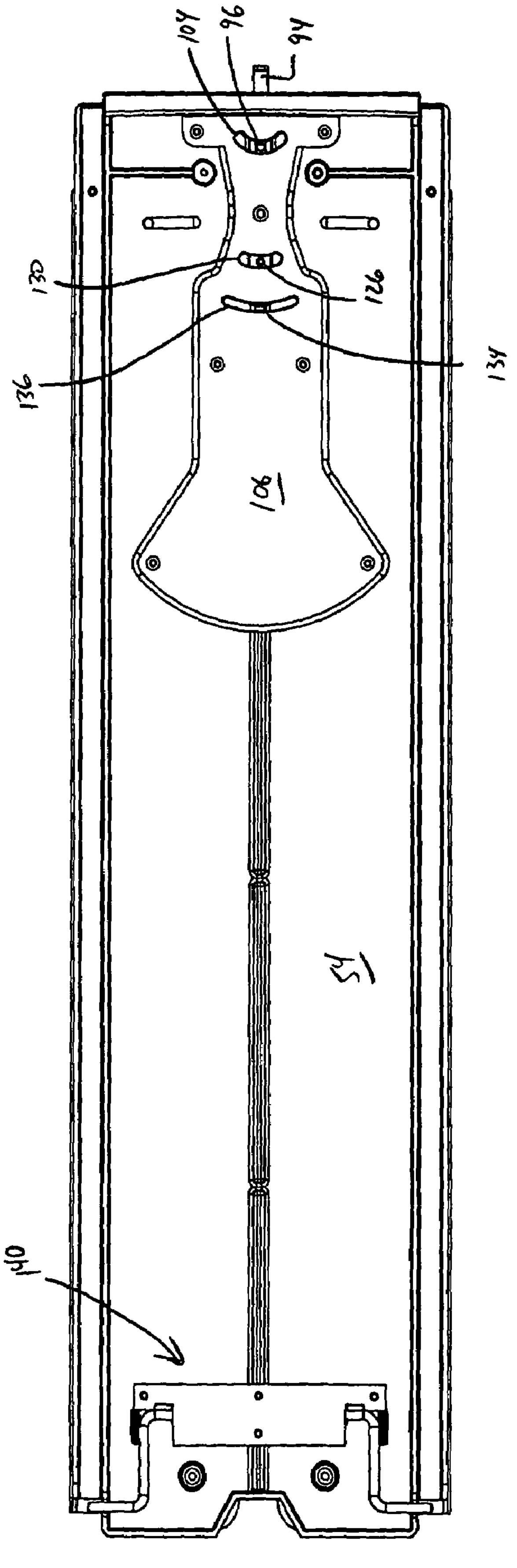
Figure 6:
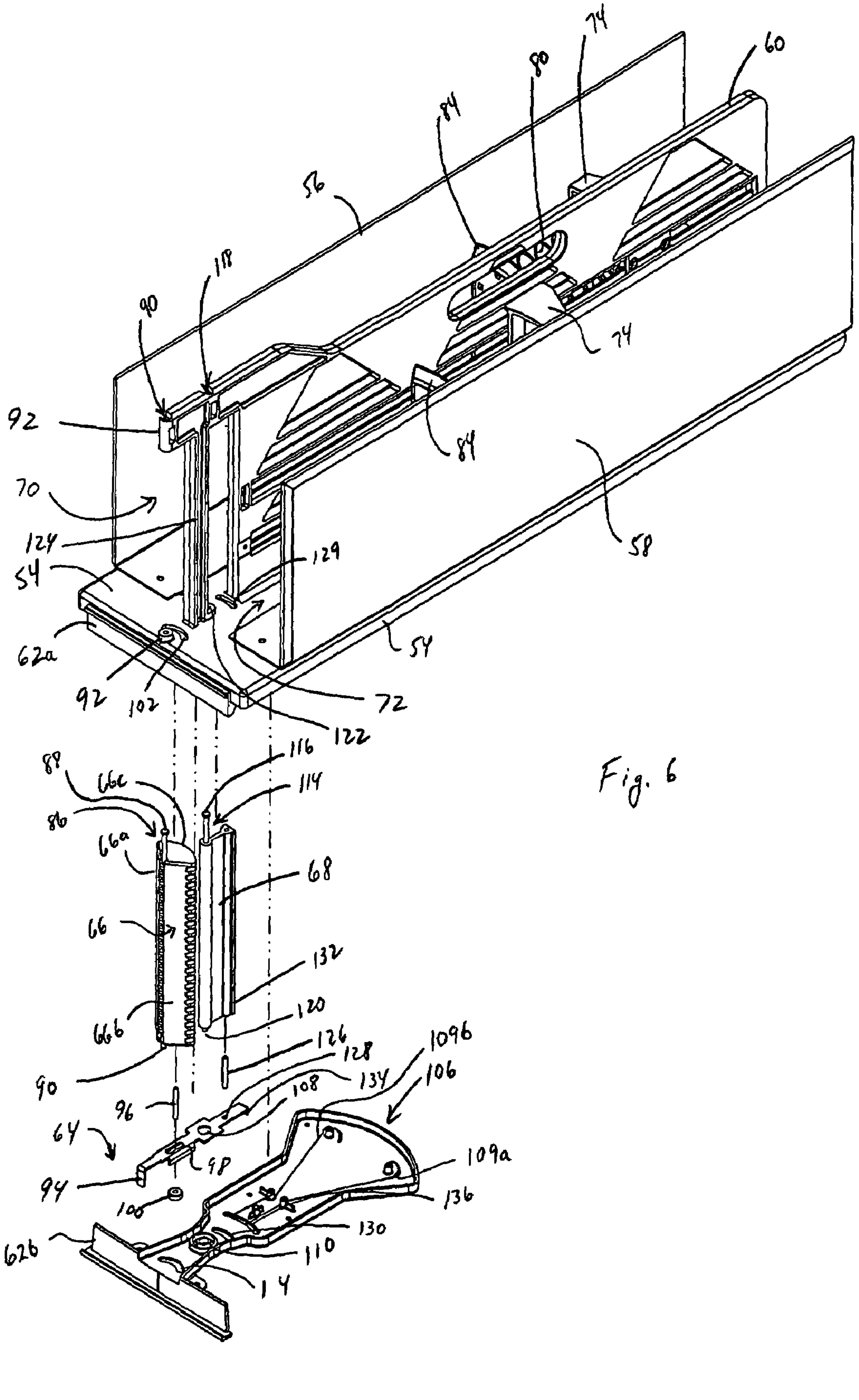
Figure 8:
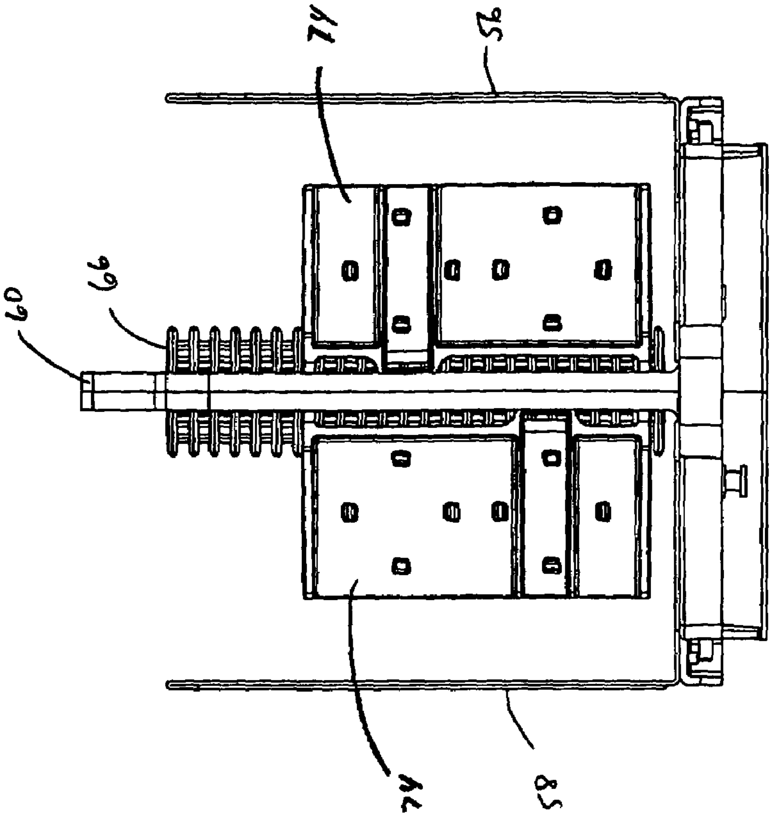
Figure 7:
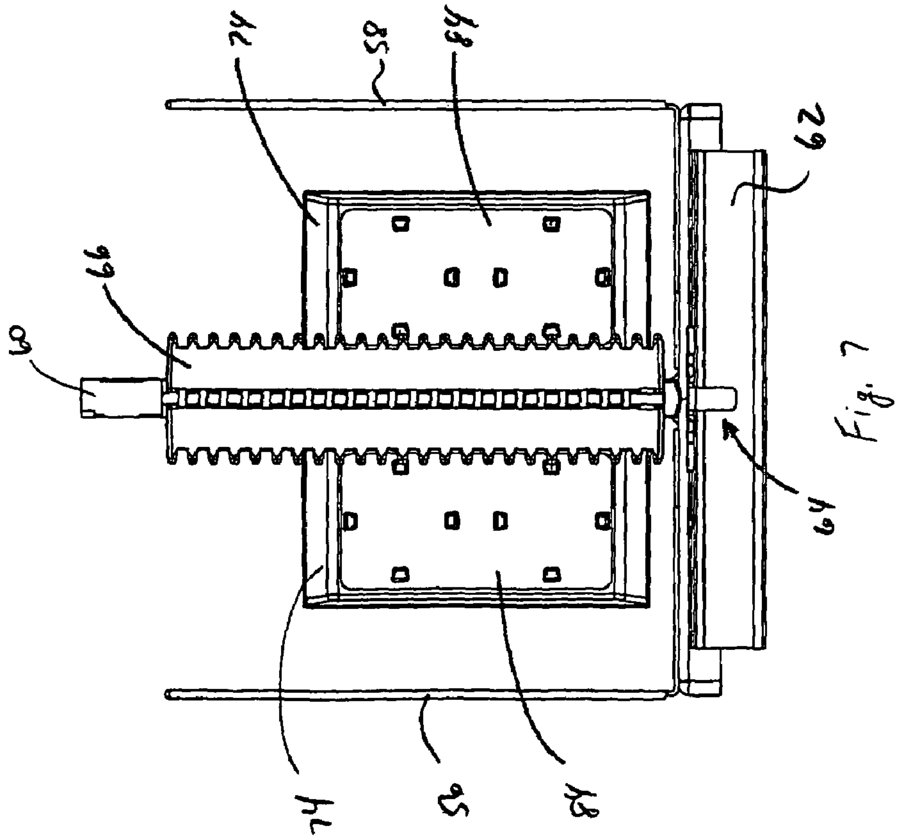

FIGS. 2 through 9 are various views of the product separation and selection tray system according to the present invention. As shown in FIG. 2, for example, the system 50 includes a base 54 and two opposed L-shaped side walls 56 and 58. The side walls 56 and 58 are slidably mounted on the base 54 so as to be able to be varied in lateral separation distance from each other and from central fixed dividing wall 60 to accommodate various sized products to be dispensed. An indicia display holder 62 (made of component parts 62*a* and 62*b*, as shown in FIG. 6) is located on a leading edge of base 54 to identify a product's name, a price of the product and/or to identify indicia to be entered into keypad 40 to select a particular product.

Projecting in front of the label holder 62 is an actuating lever 64. Actuating lever 64 controls operation of a rotator 66 and a gate 68 for dispensing of product from a space 70 defined between side wall 56 and central wall 60 or a space 72 defined between central wall 60 and end wall 58.

Figure 9:
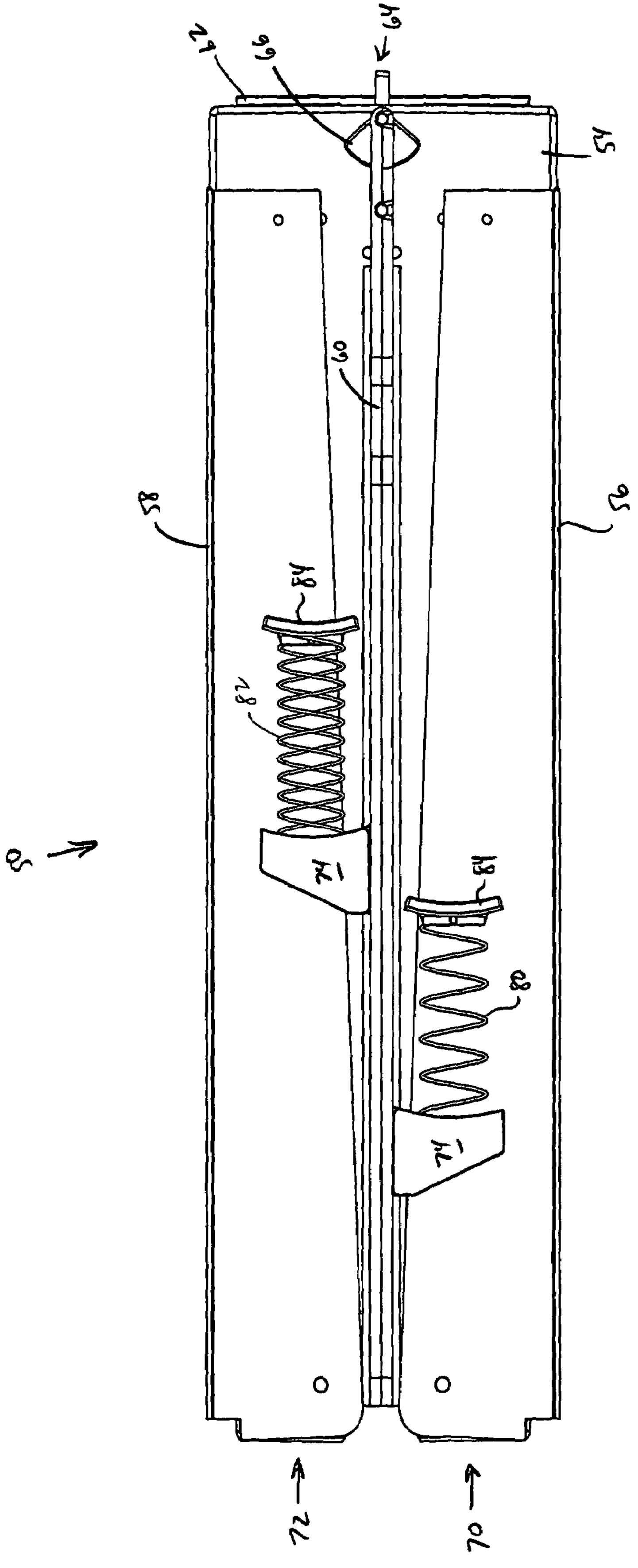

As shown in FIG. 9, product is moved toward the leading edge of the system 50 by the use of feet 74 having a projection 76 which is slidable in a track 78 of the central wall 60 for placement of the feet relative to the forward end of the base 54. Alternatively, the track may be positioned in the base.

Projecting forwardly from the feet 74 is either a single helix spring 80 or double helix spring 82 terminating in a slider 84. The force of the springs 80 or 82 is sufficient to advance product in the direction of rotator 66 for dispensing of product into a delivery cup as will be explained in more detail later. As will be explained with reference to FIGS. 5 and 6, the product separation and selection tray system of the present invention includes rotator 66 having flat side surfaces 66*a* and 66*b* intersecting at one end and terminating at an opposite end in curved surfaces 66*c*. At the intersection of flat surfaces 66*a*, 66*b*, is located an extended pin 86 having head 88 engaged in recess 90 at a leading edge 92 of central wall 60. The opposite end 90 of pin 86 is engaged in a bushing 92 mounted on the upper surface of base 54.

The pin 86 fixed in the rotator 66 allows pivotal movement of the rotator during movement of the tab portion 94 of the lever 64. A pin 96 extends through arcuate slot 102 in the base 54 and through a slot 98 in the lever 64 to engage at its bottom end in bushing 100. Pin 96 then passes into arcuate slot 104 of retaining plate 106. Retaining plate 106 is secured to the underside of the base 54 as shown in FIG. 5. The upper end of pin 96 is secured within rotator 66 at a point midway between sides 66*a* and 66*b* along a radial line projecting from pin 86 in the direction of curved side 66*c*. The lever 64 is pivoted around boss 110 by the anchoring of circular opening 108 of the lever 64 in the boss 110 projecting upwardly from the retaining plate 106.

For example, the rotators 66 shown on shelves 52*a*, 52*c*, 52*d* and 52*e* in FIG. 1, illustrate the normal, at rest positioning of the rotators 66. However, when the tab 94 is contacted and moved to the right as shown in the system 50 on shelf 52*b*, the rotator 66 is pivoted such that side 66*a* is in line, parallel with central wall 60. Then rotator 66 allows product 112 to be advanced past rotator 66 under the bias force of spring 80.

Simultaneous with the shifting of the rotator 66 is the movement of the gate 68 in an opposite direction. Gate 68 is mounted at one end on an elongated pin 114 having pin head 116 mounted in a recess 118 in central wall 60. The bottom end 120 of the pin 114 is mounted in a circular recess 122 defined in a partition 124 separating the rotator 66 from the gate 68.

A pin 126 extends through a circular opening 128 in the lever 64 and then passes through arcuate slot 129 in base 54 and arcuate slot 130 in the retaining plate 106. The opposite end of pin 126 is secured in a recess in a trailing edge 132 of gate 68. A rear terminal flange 134 of the lever 64 is slidable in arcuate slot 136 in retaining plate 106.

In operation, when the tab 94 of lever 64 is moved in one direction, the lever 64 pivots about pivot boss 110 and the retaining flange 134 at the opposite end of the lever 64 moves in the opposite direction to the tab 94. This action causes side 66*a* of rotator 66 to move to a position parallel to central wall 60. Gate 68 will simultaneously move its rear edge 132 in a direction perpendicular to central wall 60 in channel 70 so as to prevent advancement of a second, successive product in channel 70 against the bias force of spring 80.

When force on tab 94 of lever 64 is released, two springs 109*a*, 109*b* return the lever 64 to its central, at rest position. This bias force would then force gate 68 to its at rest position, parallel to and within the confines of central wall 60. The rotator 66 would also pivot to its at rest position as shown in the system 50 on shelf 52*a*, for example. The return of the gate 68 to its alignment with central wall 60 would allow advancement of the second, successive product under the force of spring 80 until engaging with the rotator 66, ready for the next dispensing operation.

By the adjustment of the sidewalls 56, 58, different sized products may be preloaded at a remote location onto a product separation and selection tray system of the present invention. When refilling the vending machine, an existing empty tray system 50 may be removed and replaced by a preloaded tray system 50. Determination of product to be dispensed may thereby be made at a remote location with removal of an existing tray system and insertion of a new tray system at the vending machine.

Alternatively, new product may be pushed in from the front. Also, it is possible to remove the tray "on site" and add new product from the rear of the tray.

It is understood as being within the scope of the present invention that an engaging mechanism 140 as shown on the underside of the base 54 in FIG. 5, can be used to engage with complementary shaped openings in a rear portion of shelves 52*a* through 52*e*. Therefore, as long as the total width of each shelf is known, the modular feature of the tray system 50 may be used to design mounting of an appropriate number of tray systems 50 on each shelf.

Figure 10:
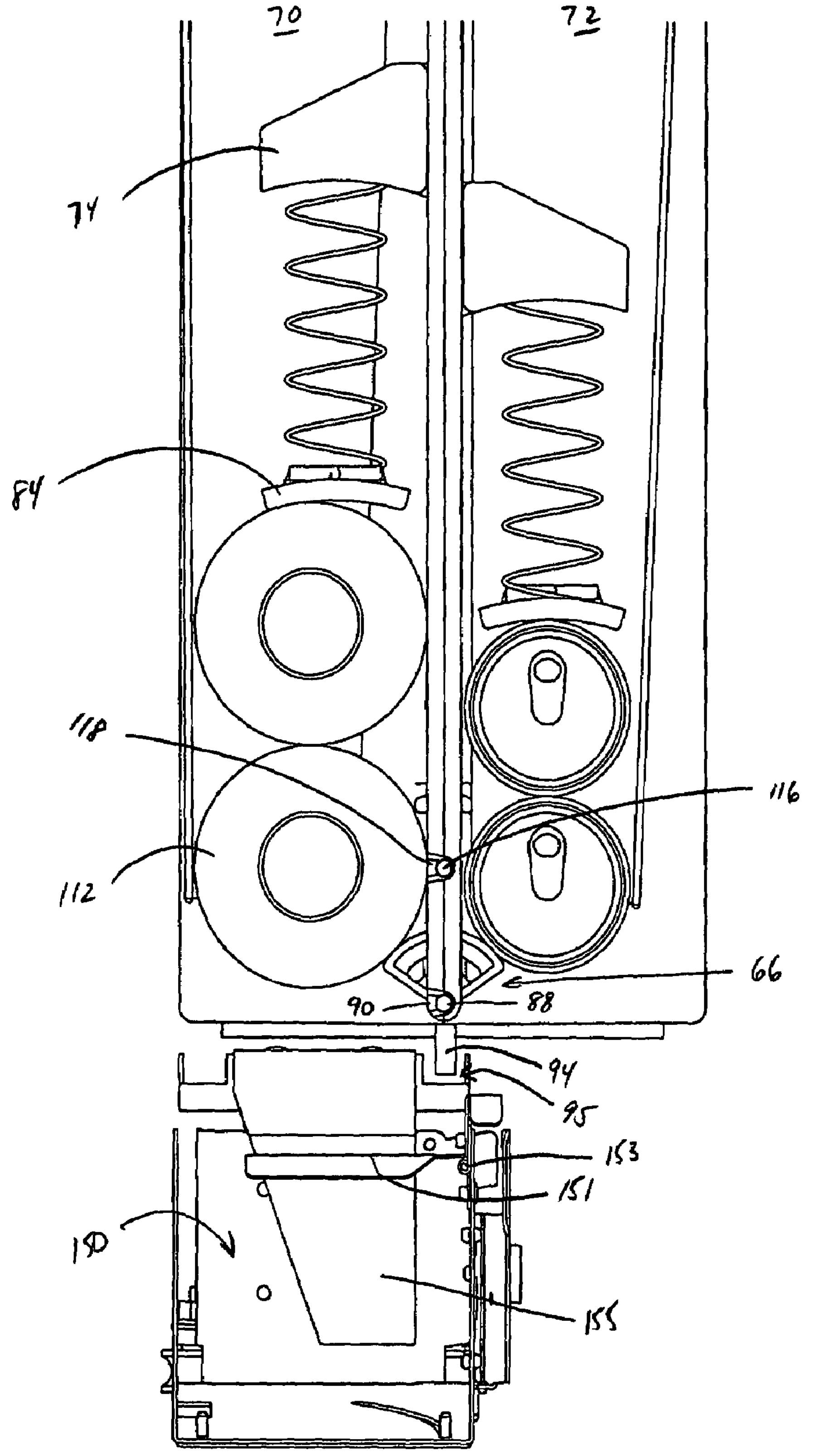
FIG. 10 is a plan view of an X-Y axis product acquisition and transport system aligned with one column of the product separation and selection tray system prior to engagement of a projecting tab portion of a lever for release of product to a cup of the product acquisition and transport system.
Figure 11:
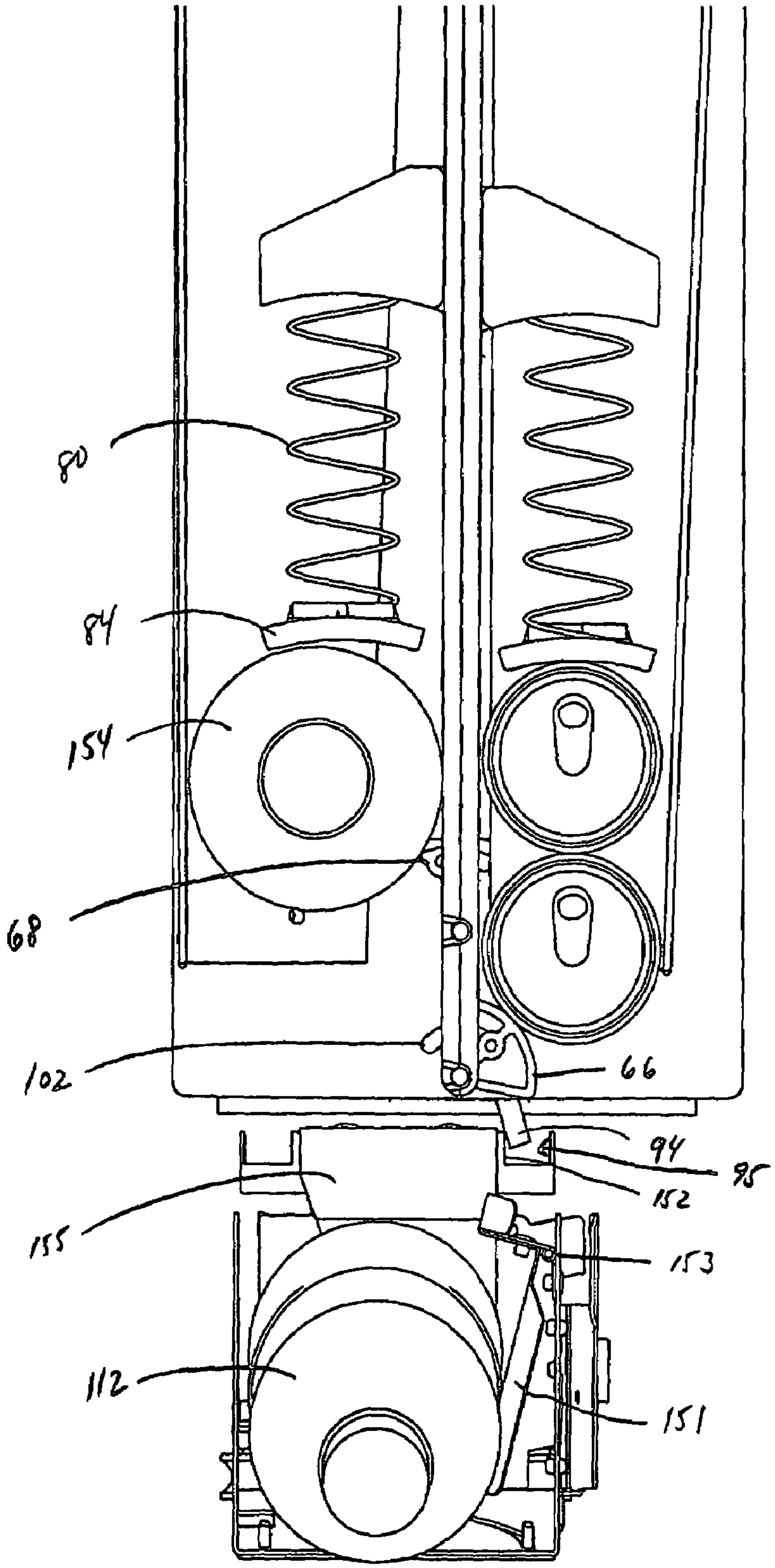
FIG. 11 is a plan view illustrating the engagement of the cup of the product acquisition and transport system by engagement with the projecting tab of the lever of the separation and selection tray system so as to pivot a rotator out of engagement with the product and pivot a gate into engagement with a successive product.
Figure 12:
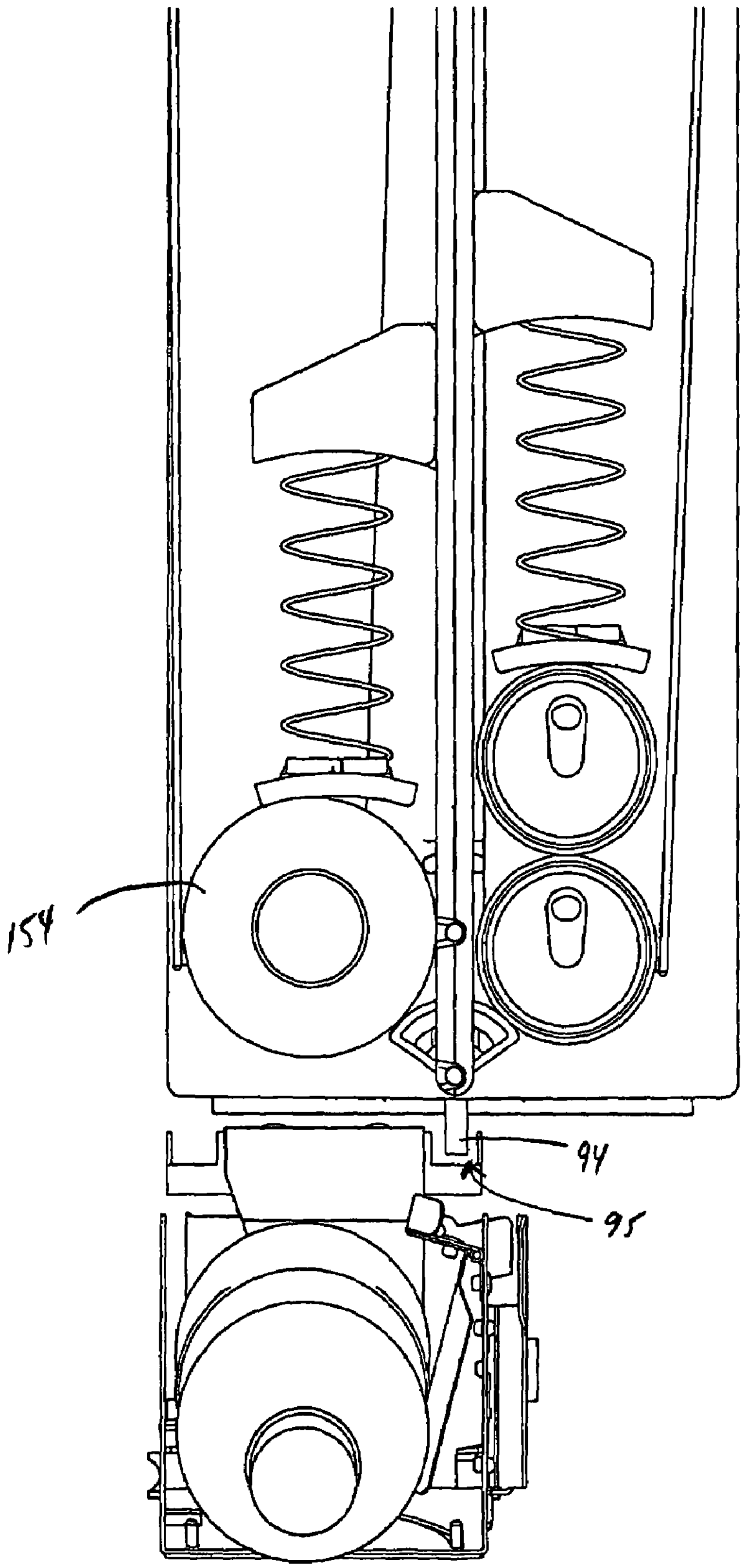
FIG. 12 illustrates the release of the projecting tab of the lever so as to pivot the gate into alignment with a central wall for advancement of the successive product and engagement with the rotator.

In FIGS. 10 through 14, the progression of release of product 112 into an elevator cup 150 of a product acquisition and transport system is illustrated. Initially, the X-Y axis product acquisition and transport system is driven, based upon keypad actuation of a desired choice of product to raise the elevator cup in the Y-direction with selection channel 95 surrounding tab 94 of lever 64. As shown in FIG. 11, when the tab 94 of lever 64 is engaged by a sidewall 152 of channel 95, upon sideways movement of the cup 150, the rotator 66 moves out of the way of the product 112 and the gate 68 engages the next successive bottle 154. The forward movement of the bottle 154 is actuated by the slider 84, as biased by spring 80, until the bottle 154 engages the gate 68 as shown in FIG. 11. Alternatively, foot 74 is biased by a flat wound spring. This could be the primary force on the bottles. Spring 80 and slider 84 could be used to move the last bottle past the gate and rotator. The release of the tab 94 by reverse lateral movement of the cup 150 to the position shown in FIG. 12 releases the gate from engaging the bottle 154 and allows forward movement of the bottle 154 until engaging the rotator 66.

During forward movement of the bottle 112, a sensor confirms placement of product in the elevator cup 150. As shown in FIG. 10, vertically extending flange 151 extends across the path of product in the cup 150. As shown in FIG. 11, the flange 151 is pivoted about pin 153 when product is pushed into the cup 150. Pivotable flange 155 stabilizes the bottle in the cup. A switch 153 is not actuated by flange 151 thereby indicating presence of a bottle.

Figure 13:
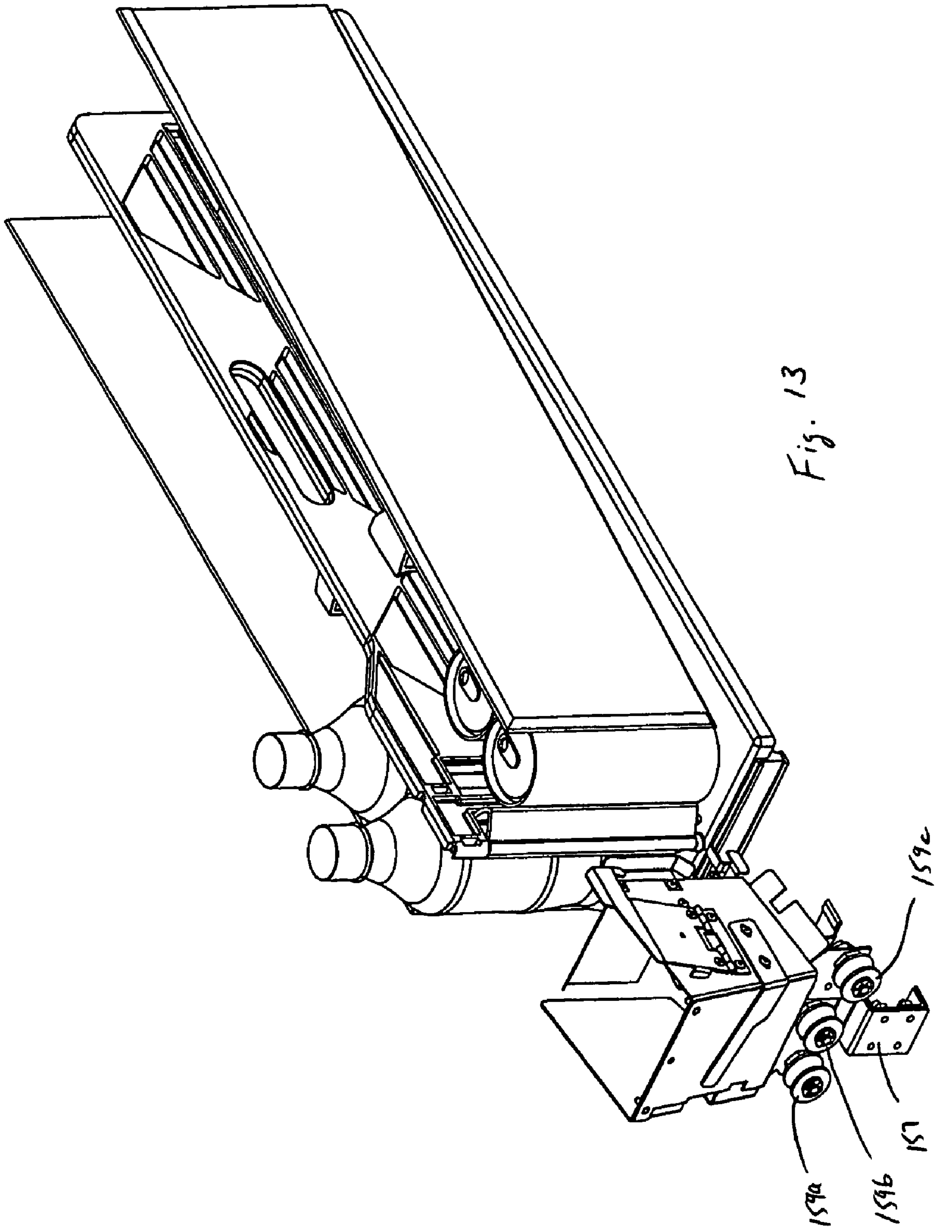
FIG. 13 is a front perspective view of FIG. 10.
Figure 14:
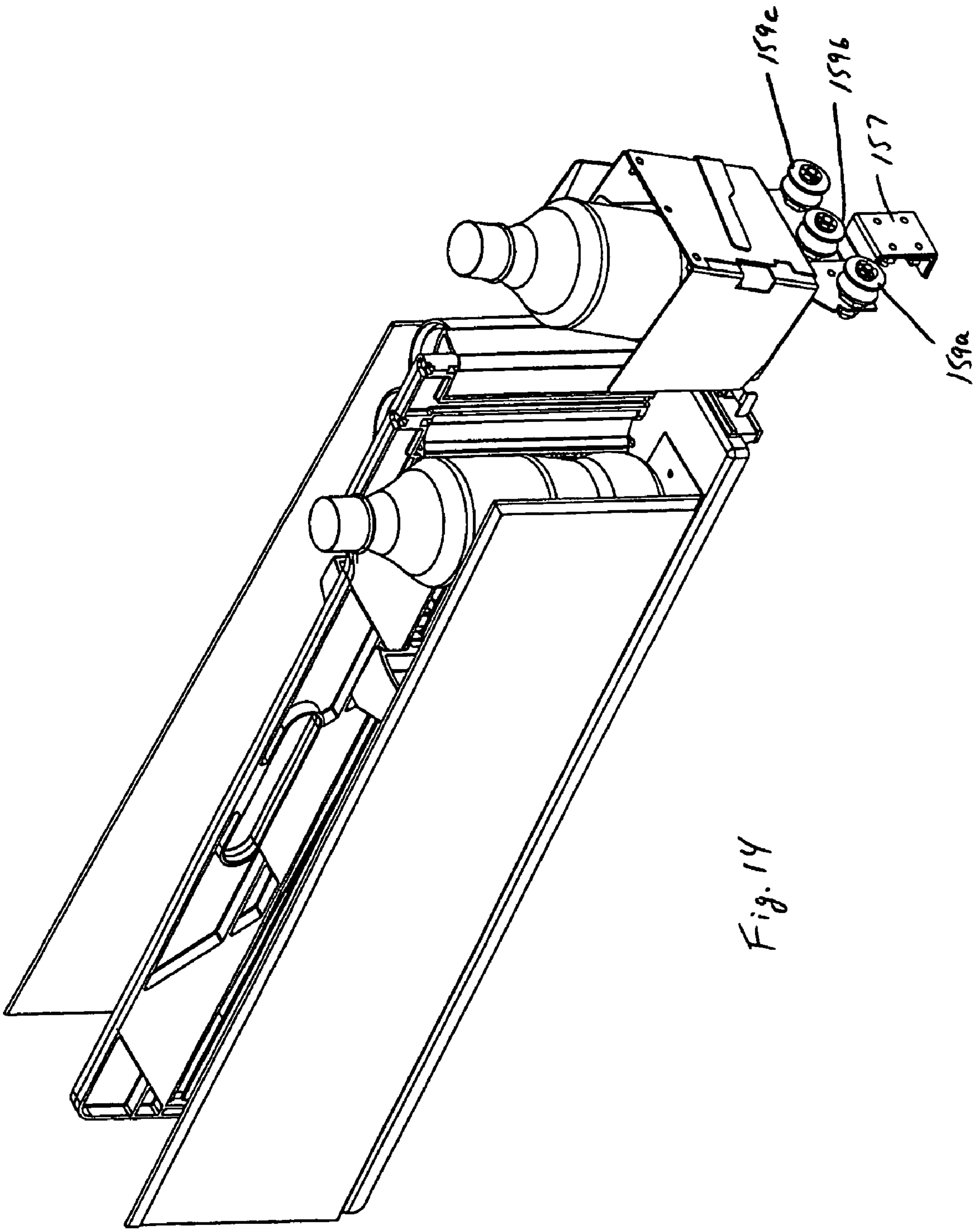
FIG. 14 is a left front perspective view of FIG. 11.
Figure 15:
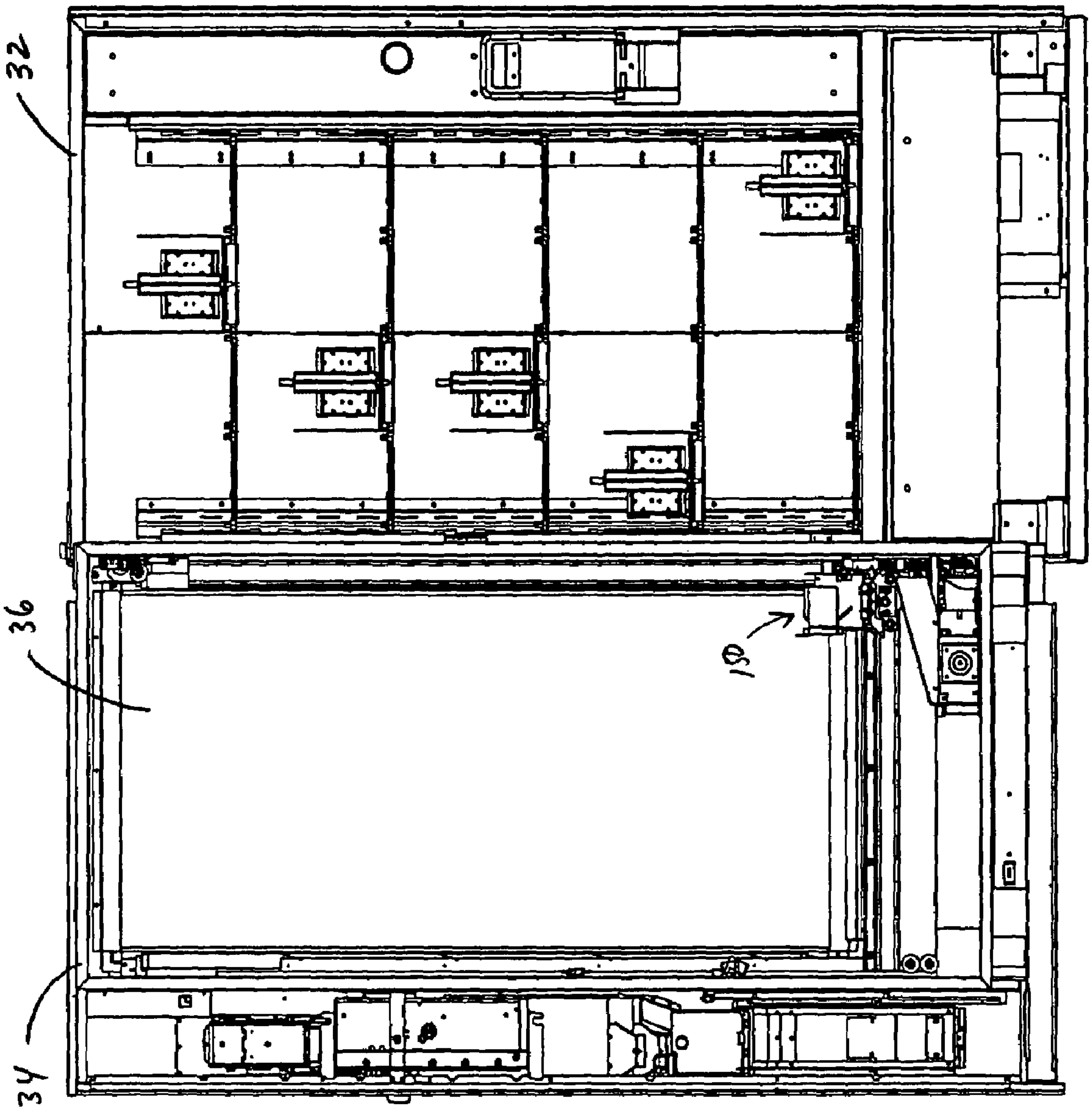
FIG. 15 is a front view of the vending machine of the present invention with the front door pivoted away from the cabinet to access the interior of the cabinet.

FIGS. 13 and 14 show details of the flange 157 for use in guiding movement of the cup 150 with respect to horizontal movement by connection to a tension element such as a horizontal toothed belt. Also guide wheels 159*a*, 159*b*, 159*c* assist in traversing along a horizontal guide rail as the guide rail is raised vertically for positioning of the cup in front of a tray system 50.

Figure 16:
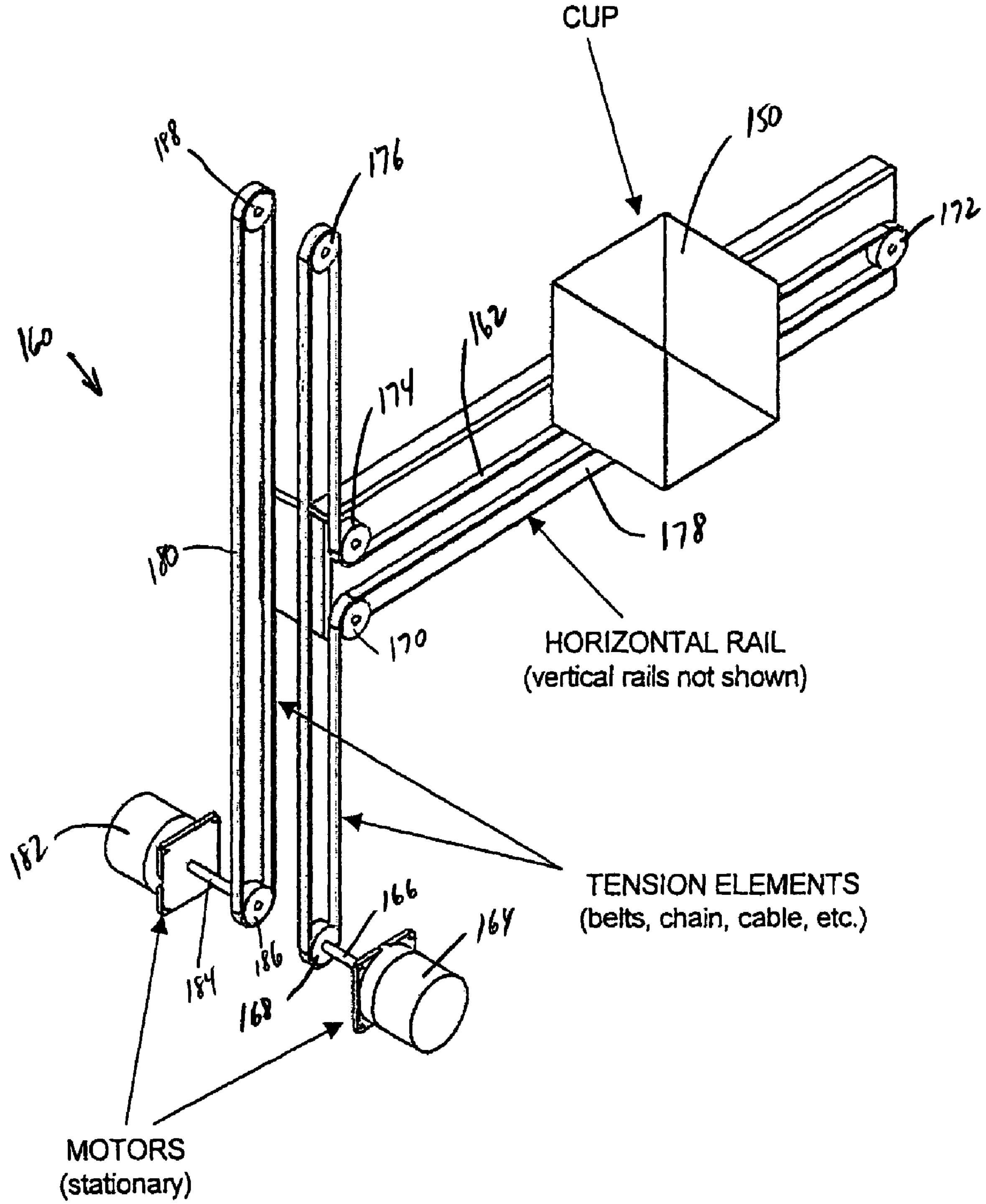
FIG. 16 schematically illustrates the X-Y axis product acquisition and transport system of the present invention.

FIG. 16 schematically illustrates the product acquisition and transport system 160 for movement of the cup 150 to any position in front of a product to be dispensed as well as for movement of the cup to deliver the product to a discharge port. Cup 150 is secured to tension element 162 which may be a belt, chain or cable for movement of the cup by rotation of a fixed motor 164. The motor is connected by a drive shaft 166 to a drive roller 168. Actuation of the motor causes the tension element 162 to run across driven rollers 170, 172, 174 and 176. The rollers 170, 172, 174 are mounted on a horizontal rail 178. When the rail 178 is fixed in position, movement of the tension element 162 causes the cup 150 to traverse the rail so as to be located in front of a particular separation and selection tray system 50.

Movement of the cup vertically is accomplished by a tension element 180 driven by a fixed motor 182 having drive shaft 184 and drive roller 186. The tension element 180 is fixed to the rail 178 so upon actuation of the motor 182, the tension element 180 rotates around driven roller 188 for vertical movement of the rail and thereby also the cup 150.

Figure 17:
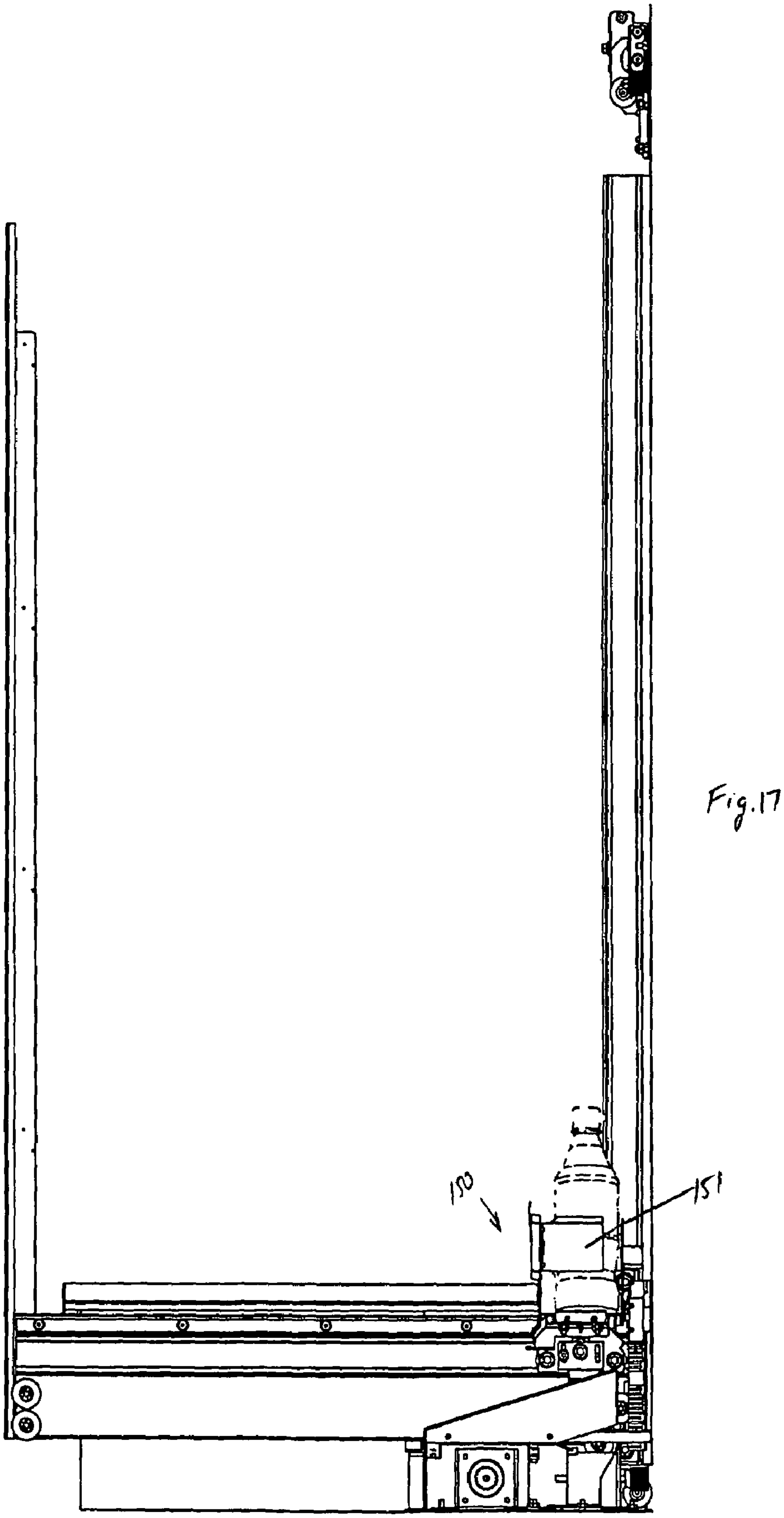
FIG. 17 is a front view of the cup of the product acquisition and transport system holding a product on one side of the front door of the vending machine with the details of the interior of the control panel and delivery port having been omitted for clarity.
Figure 18:
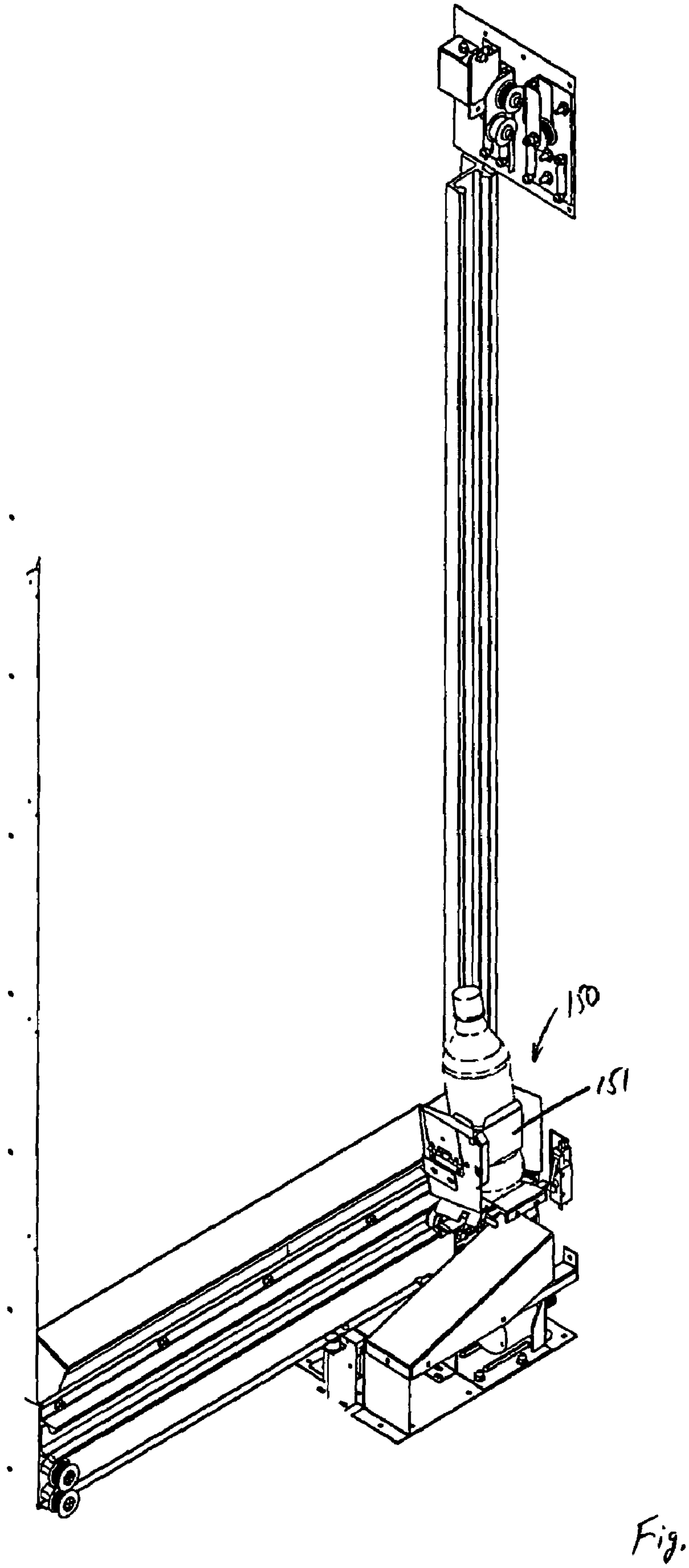
FIG. 18 is a perspective view of the cup holding the product as shown in FIG. 17 to illustrate the horizontal rail on which the cup slides.
Figure 19:
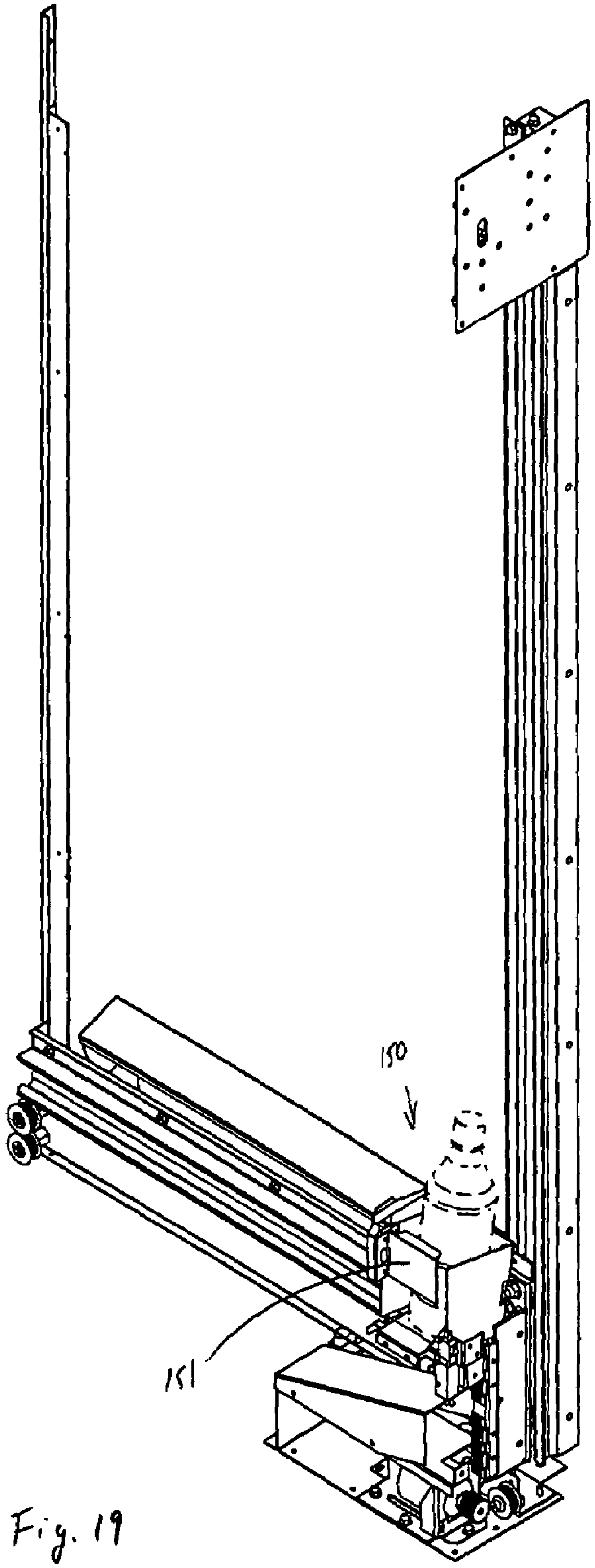
FIG. 19 is a perspective view from the opposite side of FIG. 18.

In FIGS. 17 through 19, various views are shown of the positioning of the cup adjacent to a delivery door (not shown). The product is shown in dotted lines, since for illustrative purposes, the elevated position of flange 151 indicates that product should not be present in the cup 150.

Figure 20:
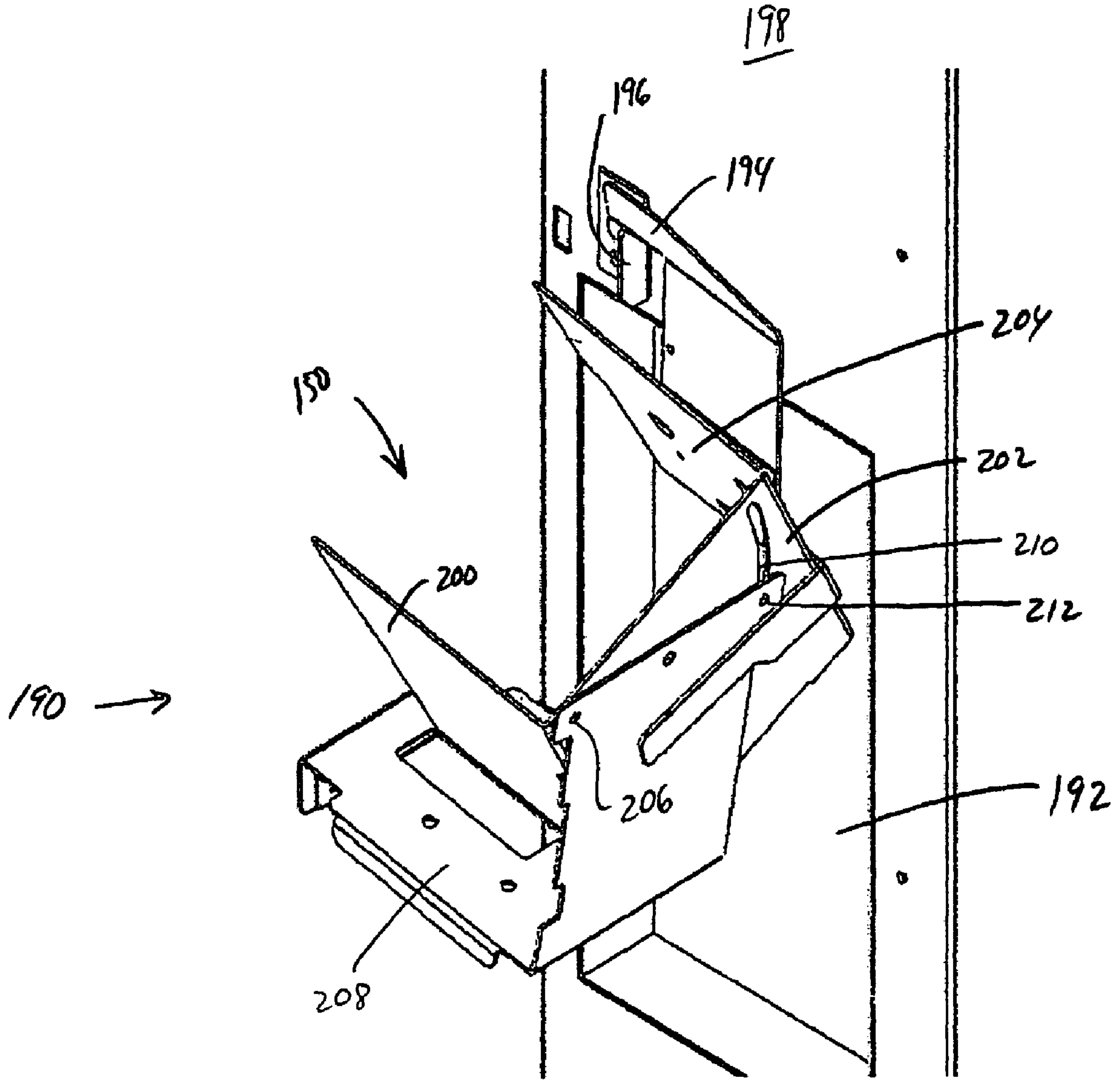
FIG. 20 schematically illustrates the mechanism for tilting of the cup by engagement of a projection on a side of the cup with a projection extending from a fixed wall of the product delivery system.
Figure 21:
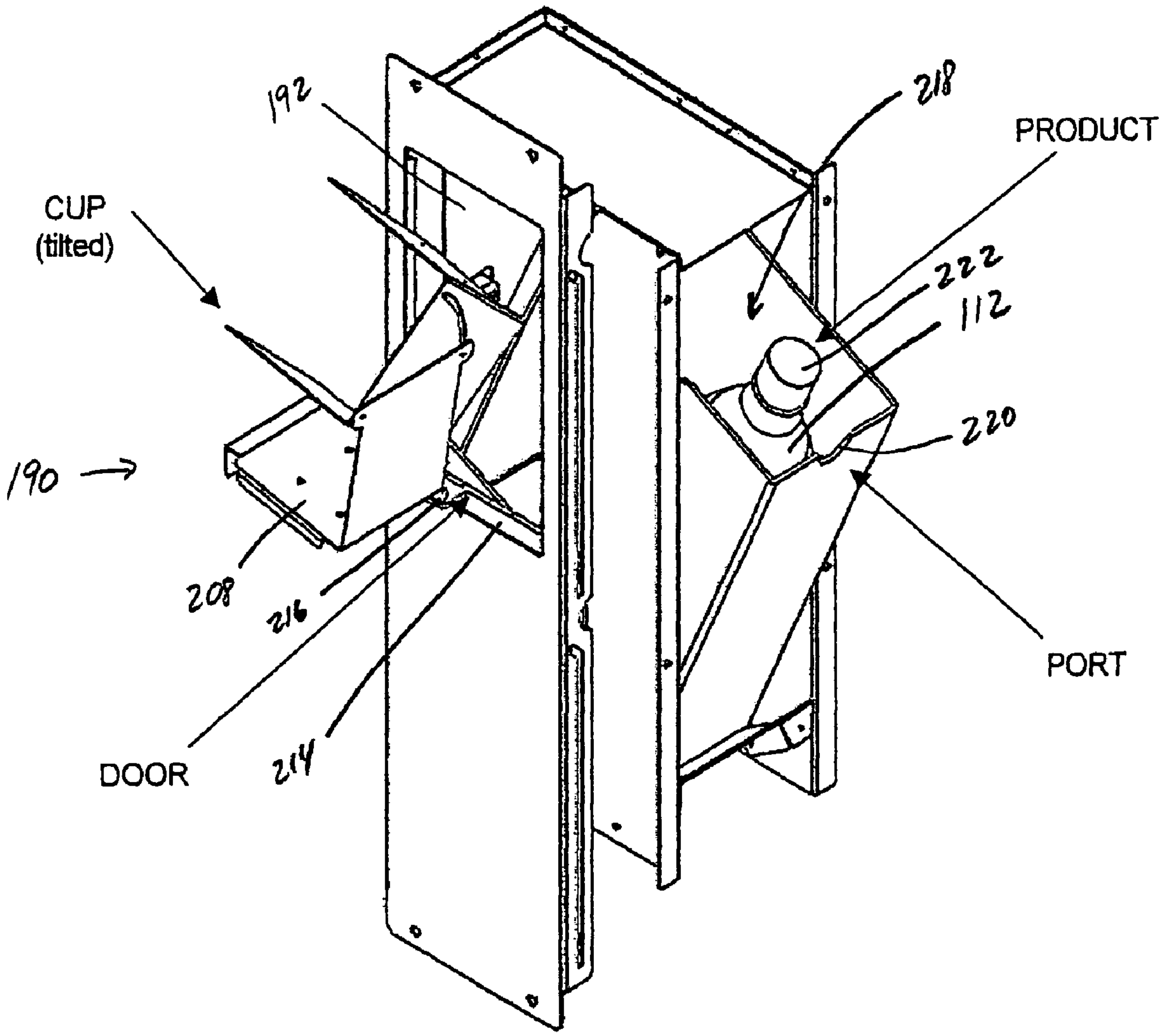
FIG. 21 illustrates the opening of a slidable outlet port door or window and subsequent tilting of the cup to slide the product into the outlet port basket which is tiltable towards the consumer for access to and withdrawal of the product.

For delivery of product from the cup, the discharge mechanism 150 as shown in FIGS. 20 and 21 is used. The product is delivered through a discharge window 192 by engagement of an upper wall portion 194 of the cup 150 with a projecting tab 196 fixed on a sidewall 198 of the discharge port. Continued downward movement of the cup causes three interconnected sidewalls 200, 202, 204 of the cup to pivot around pivot point 206. The sidewalls 200, 202 and 204 engaging a product, tilt the product until the bottom of the product clears the bottom wall 208 of the cup to allow the product to slide at an angle of approximately 45 degrees into open delivery window 192. Smooth movement of the sidewalls 200, 202 and 204 is ensured by a cam slot 210 of wall 202 passing along a fixed screw or a bolt, pin or rivet 212.

As shown in further detail in FIG. 21, release of product through the window 192 is allowed by the vertical movement of the cup 150 to engage a sliding delivery door 214 which normally covers the window 192 of a delivery box. The door 214 is moved by engagement of an edge of bottom 208 of the cup with a tab 216 of the door. The product is thereby released into a delivery box 218 which is allowed to tilt forward by gravity or by engagement with a finger of the consumer in a finger hole or finger recess 220. The delivery box 218 is tilted so that the product 112 may be grabbed by its cap 222 and removed from the machine.

A mechanism prevents the delivery box 218 from tilting out of the machine until after the door 214 is moved to the retracted position shown in FIG. 21 and the product is dropped into the basket. Not until upward movement of the cup and release of the sliding door, so that the door may cover the delivery window 192, will the basket be allowed to be pivoted towards the consumer for access to the product. The prevention of pivoting of the delivery box 218 until the sliding delivery door 214 is closed, prevents the customer's hand from being injured during delivery of the product into the basket.

FIGS. 22 through 32 illustrate the delivery of product from the elevator cup 150 through the delivery window 192 after opening of the delivery door 214 and passage of the product into the delivery box 218.

Figure 22:
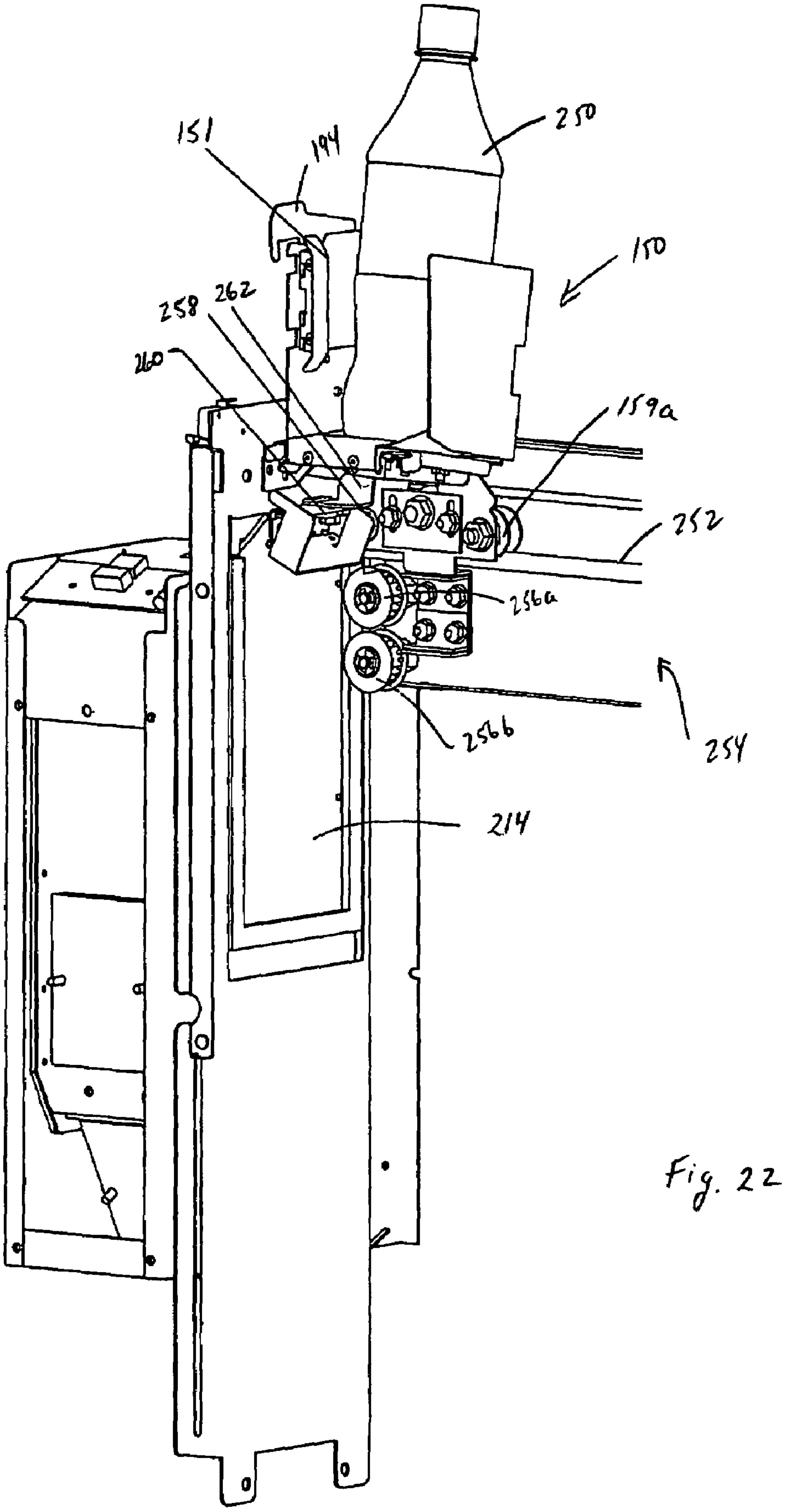
FIG. 22 illustrates the elevator cup first opening the port latch and contacting the delivery door.

As shown in FIG. 22, the product 250 approaches the delivery door 214 by rollers 159*a*, 159*b* and 159*c* resting upon edge 252 of horizontal rail 254. Horizontal rail 254 is moved vertically as was explained with reference to FIG. 16. Driven rollers 256*a*, 256*b* are engaged by a tension element such as a driven chain (not shown), for example, so as to move the elevator cup 150 along the horizontal rail 254.

Figure 23:
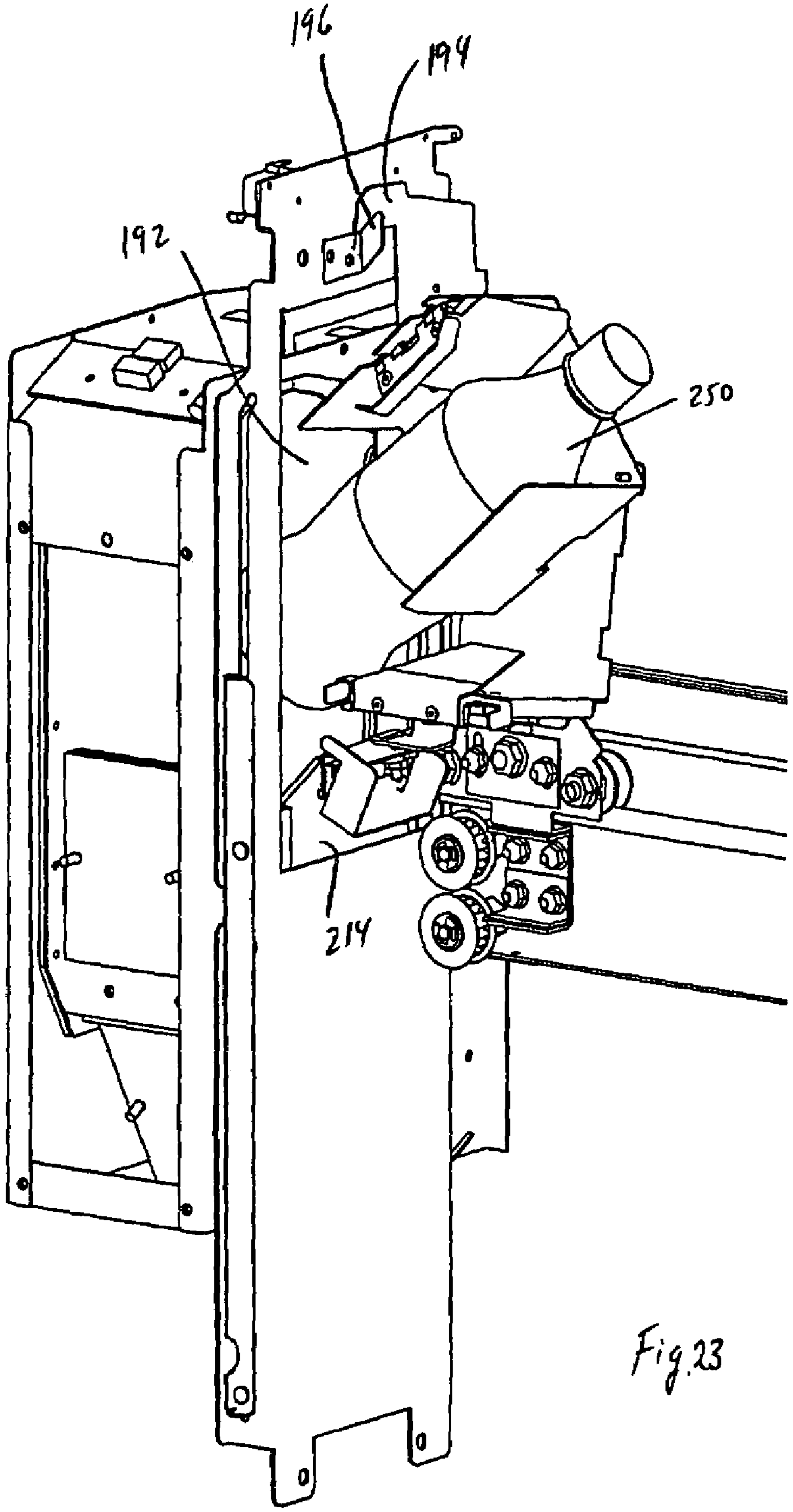
FIG. 23 illustrates the complete opening of the delivery door and the pivoting of the elevator cup to deliver product to the port box while the port latch has dropped down to engage a weld pin to prevent the delivery box from being opened during delivery of the product.

When the delivery cup 150 is in the position shown in FIG. 22, a port latch 258 located adjacent to an uppermost edge 260 of the delivery door 214 is engaged by a horizontally extending flange 262 located underneath the elevator cup 150. As the elevator cup 150 is lowered with the horizontal rail 254, the upper wall portion 194 engages the projecting tab 196 as was explained with reference to FIG. 20 and as shown in FIG. 23. Simultaneously, the delivery door 214 is lowered vertically to open window 192 so that the bottle 250 may be tilted, and by gravity, fed through the delivery window 192. The downward movement of the port latch 258 causes engagement with a weld pin to lock the delivery box in position and prevent the delivery box from being opened. This is a safety feature so that the customer's hand is not inside the delivery box as the product is being dispensed.

Figure 24:
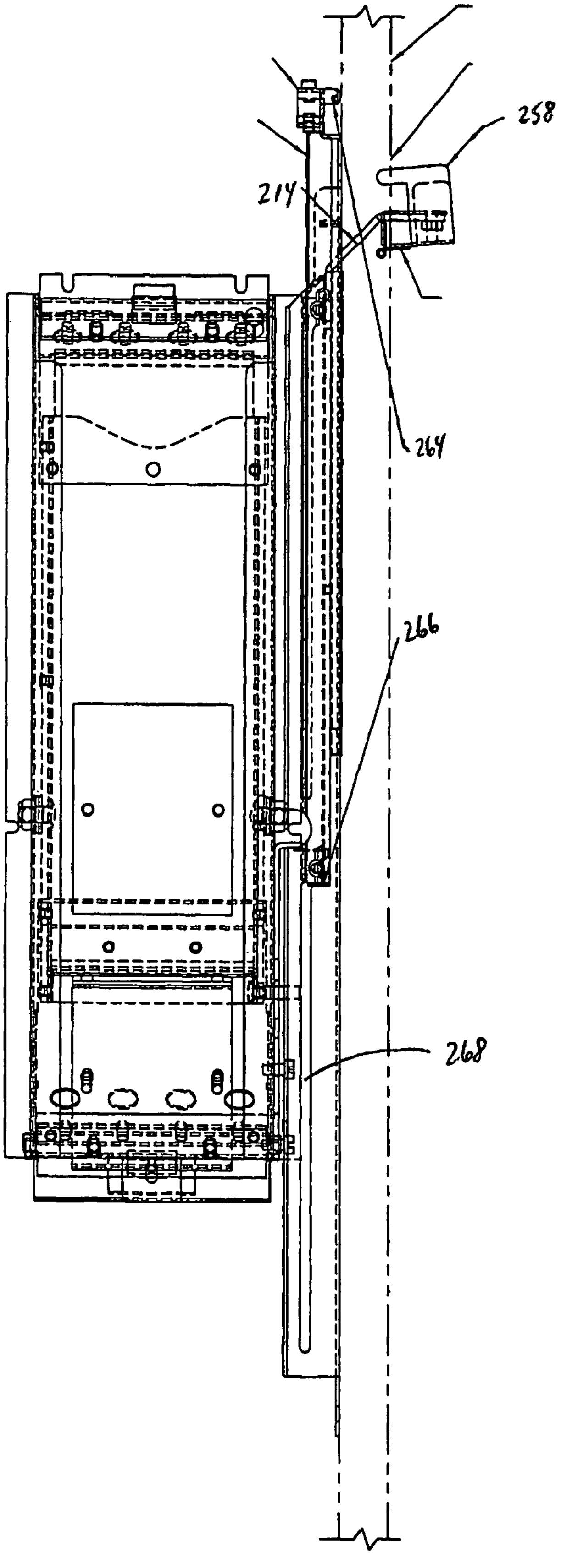
FIG. 24 shows additional details of the delivery mechanism.

In FIG. 24, the bias force on the delivery door 214 is caused by anchoring a spring at one end on projection 264 whereas the other end of the spring (not shown) is secured to a projection 266 located at the bottom of the delivery door 214. The door 214 slides in guide track 268 to ensure smooth movement.

Figure 25:
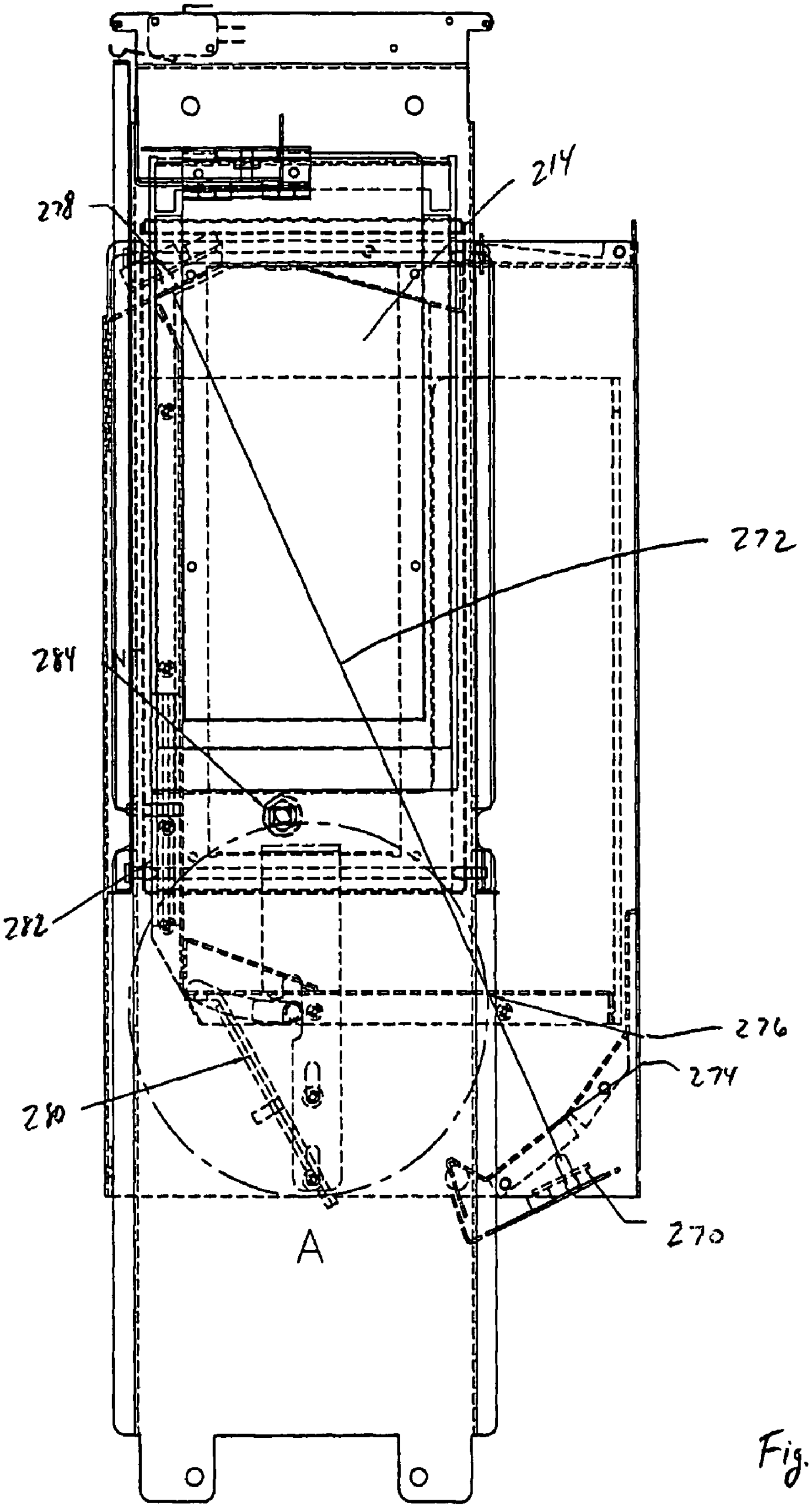
FIG. 25 is a rear view of the delivery box.

As shown in FIG. 25 from the opposite side of the delivery door 214, turned 90 degrees from that shown in FIG. 24, an optic sensor emitter board 270 projects light beam 272 through holes 274, 276 so that the line of sight with optic sensor detector board 278 is clear. When a clear line of sight is present, a signal is produced indicating that the delivery box is in position to receive a product. Counterweights 280, 282 maintain the position of the delivery box in a closed position until a product is ready to be delivered and the delivery box is pivoted about pivot point 284.

Figure 26:
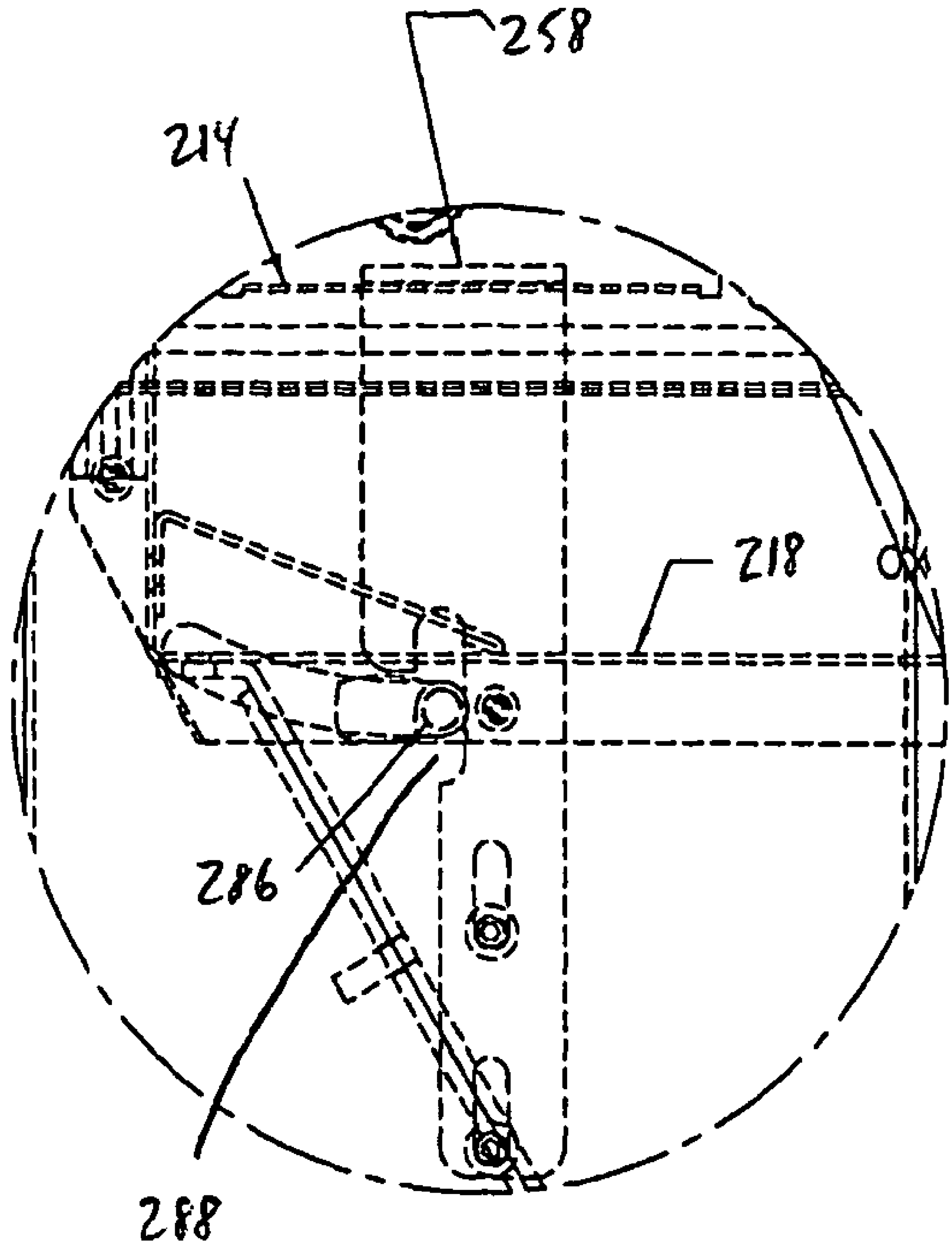
FIG. 26 is an enlarged view of the area encircled in FIG. 25.

As shown in greater detail in FIG. 26, the area encircled in FIG. 25 illustrates the port latch 258 in a rest position prior to the dispensing of product through the delivery door 214. In this position, the delivery box 218 is movable. Movement is allowed because the port latch 258 has not yet engaged weld pin 286 in groove 288 of the port latch.

Figure 27:
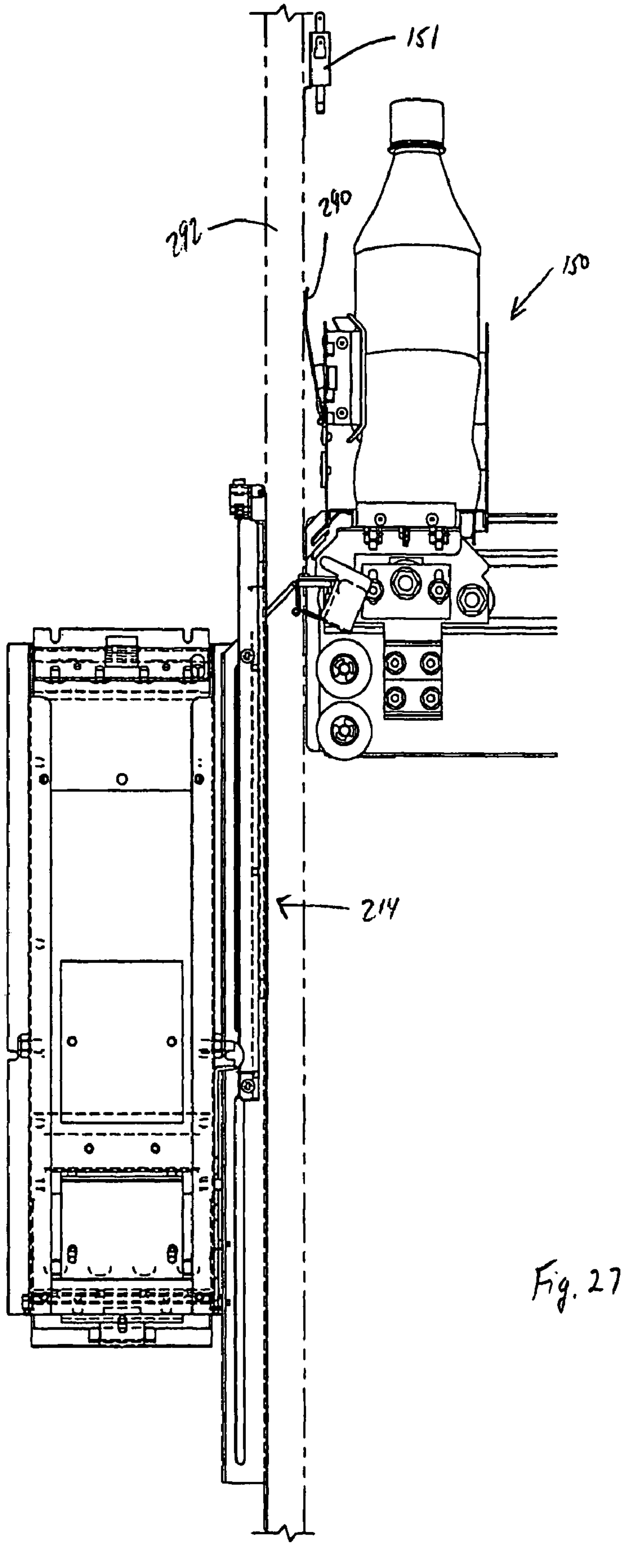
FIG. 27 shows a detailed view of an approaching elevator cup including product for delivery and initial engagement of the port latch of the delivery door.
Figure 28:
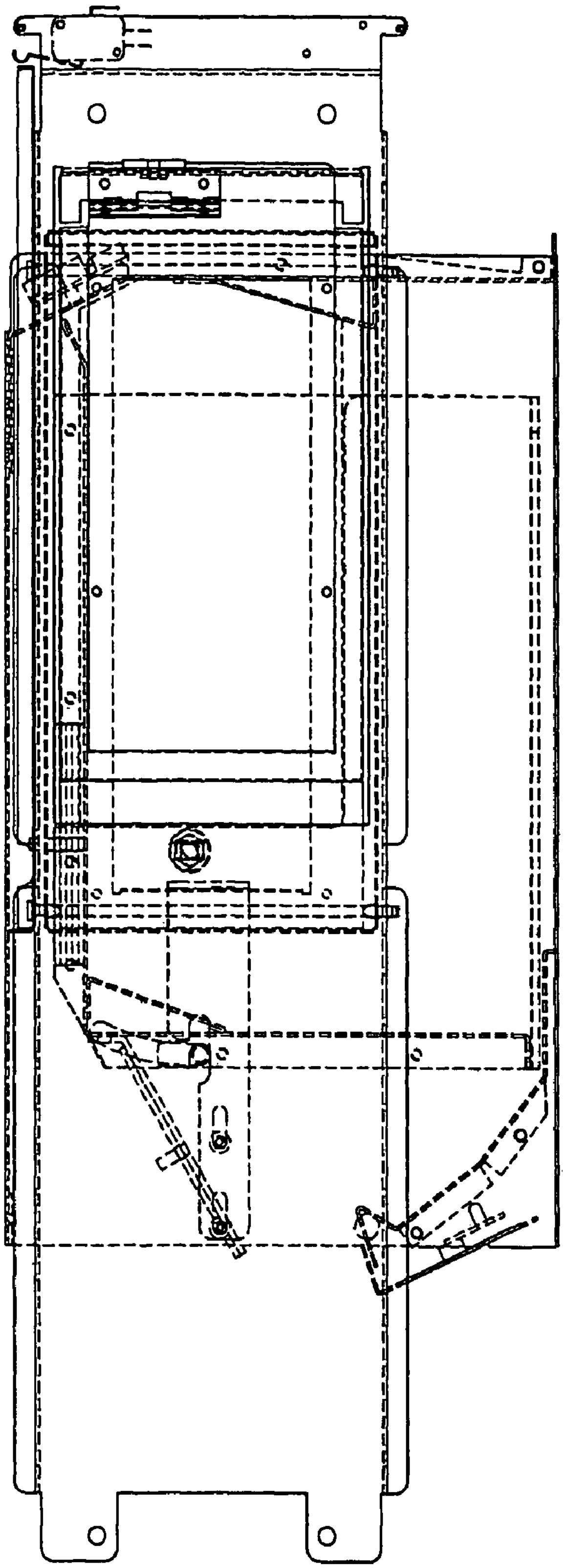
FIG. 28 illustrates the initial opening of the port latch and the contact of the delivery door.

In operation, when the elevator cup 160 approaches the delivery door 214 as shown in FIG. 27, a sensor switch 290 indicates engagement with the exterior wall 292 of the vending machine. The downward movement of the elevator cup first opens the port latch and then contacts the delivery door as shown in FIG. 28.

Figure 29:
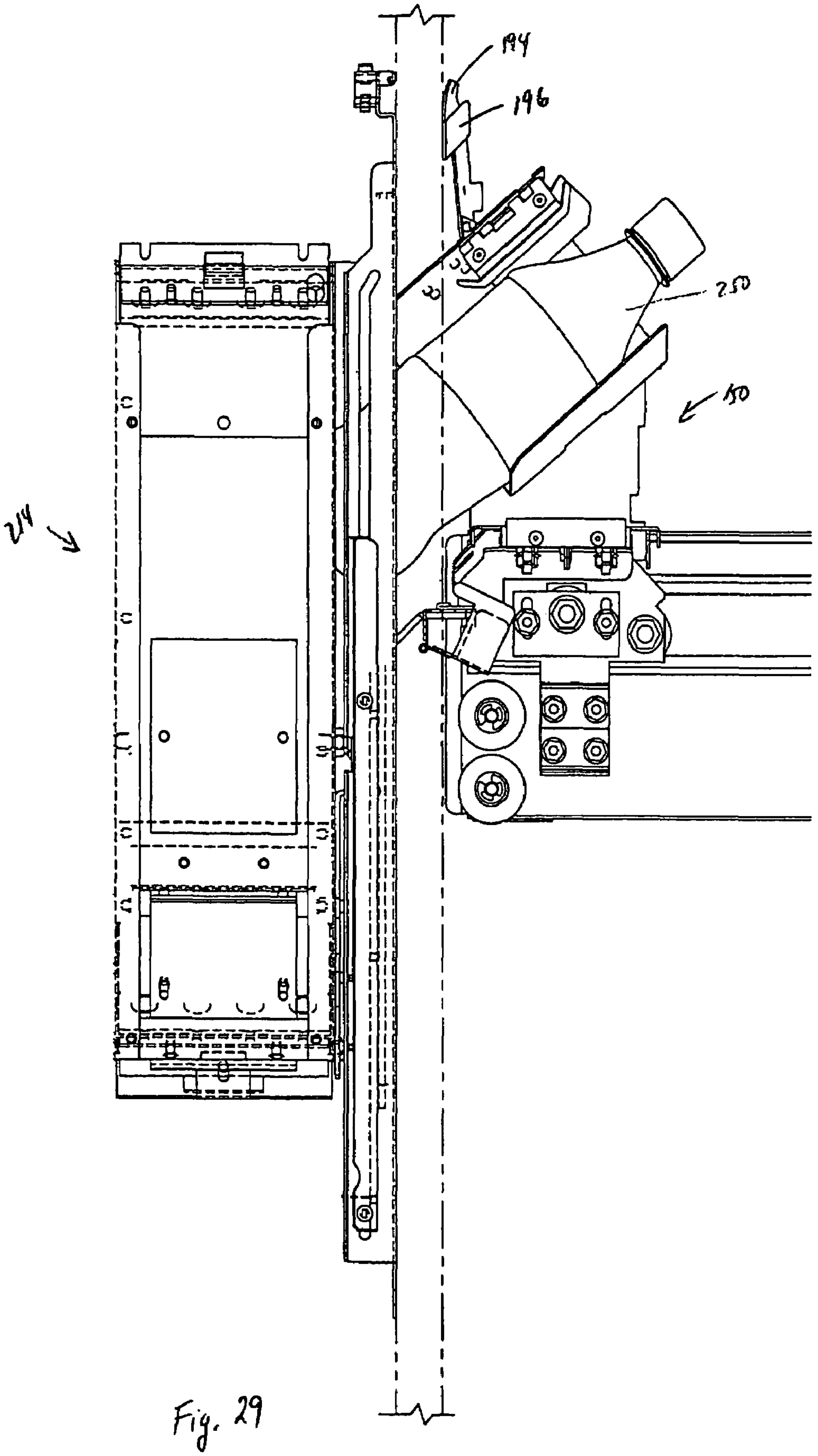
FIG. 29 illustrates a rear view of FIG. 23 where the elevator cup has completely opened the delivery door, delivered the product to the port box and allowed the port latch to drop down and engage a weld pin to prevent the delivery box from being opened.
Figure 30:
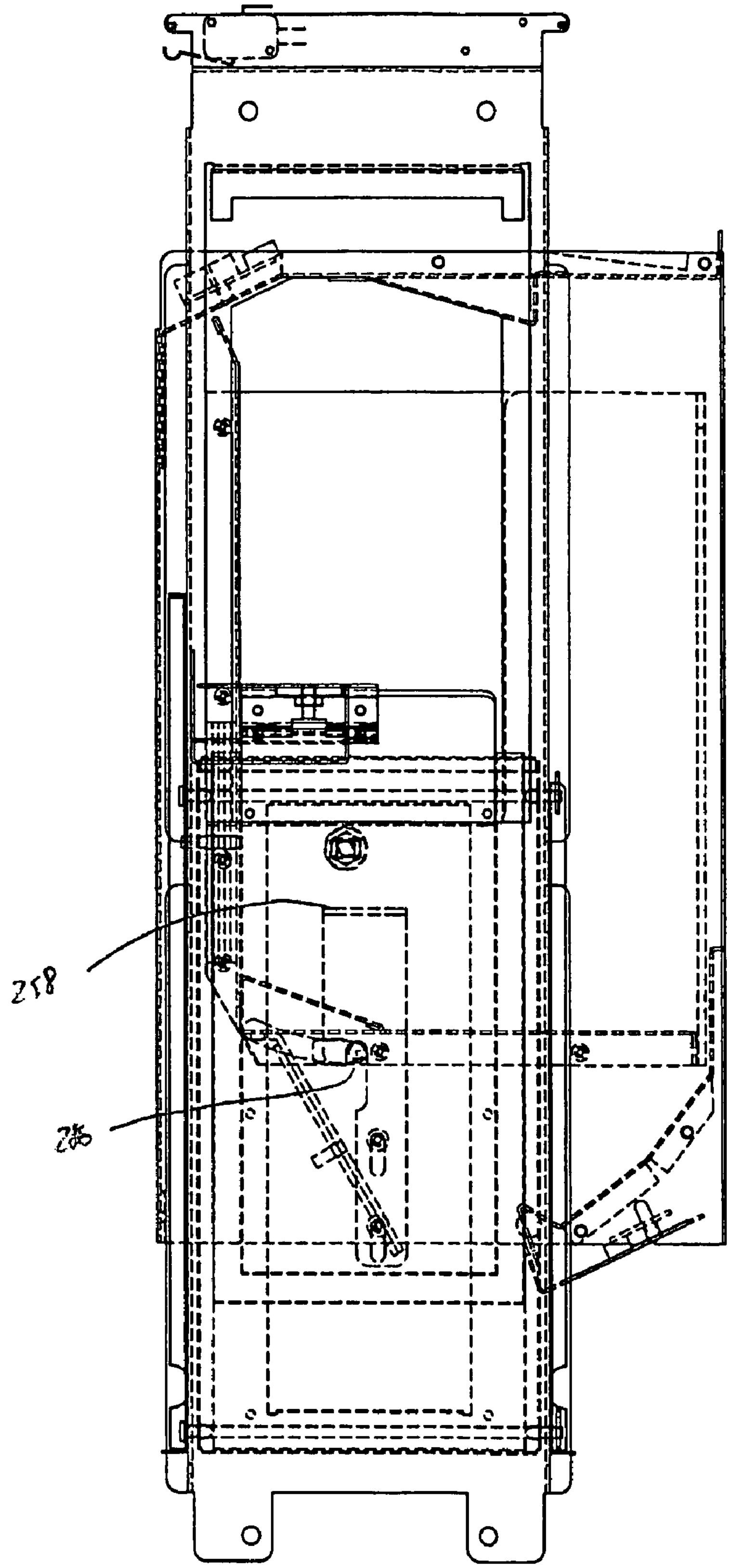
FIG. 30 is a rear view of the port latch having moved from the position shown in FIG. 25 so as to engage the weld pin.

As shown in FIG. 29, the elevator cup 150 has completely opened the delivery door. The product 250 is delivered to the delivery box 214. The delivery box is maintained in position by engagement of the port latch with the weld pin 286 as shown in FIG. 30. This prevents the delivery box from being opened.

Figure 31:
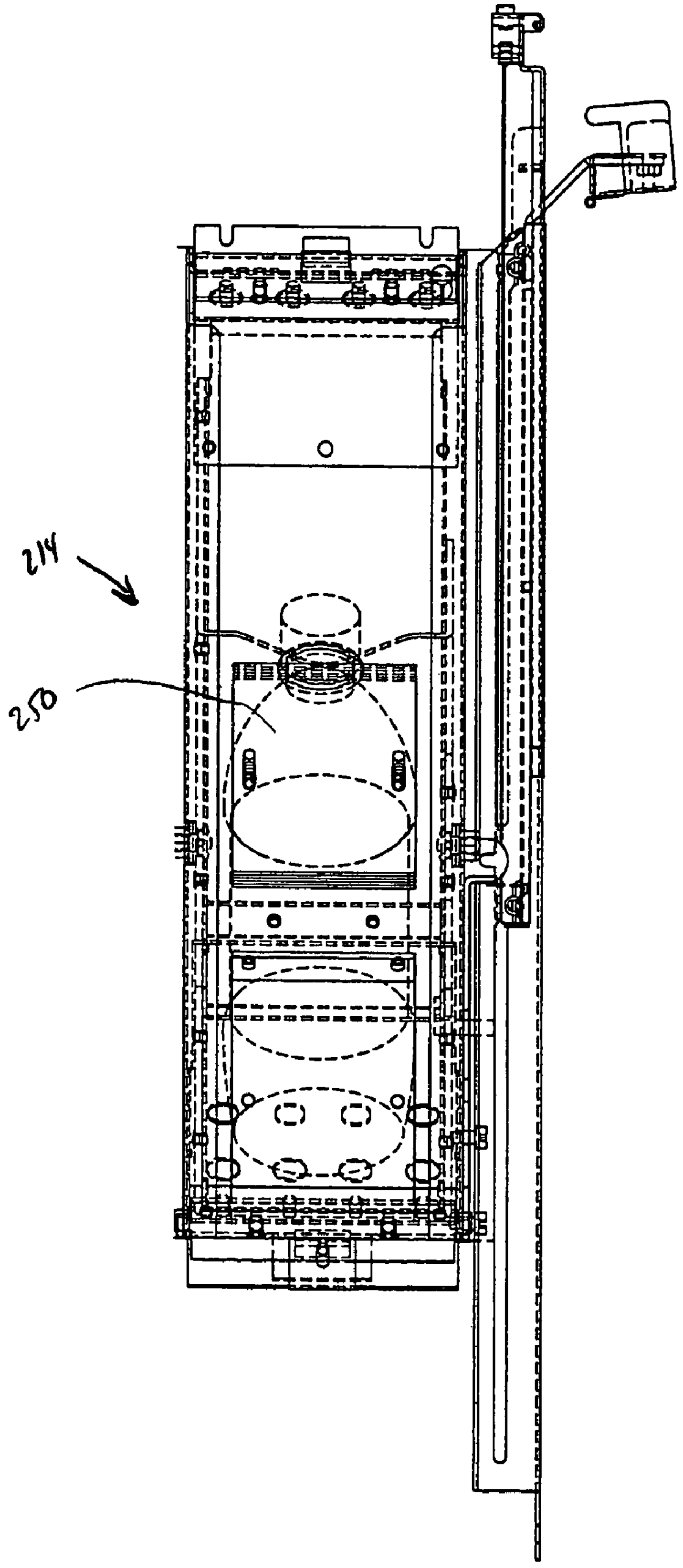
FIG. 31 is a rear view where the elevator cup has released the delivery door allowing the port latch to disengage the weld pin, allowing the weight of the product being vended to rotate the port box forward to present the product to the customer.
Figure 32:
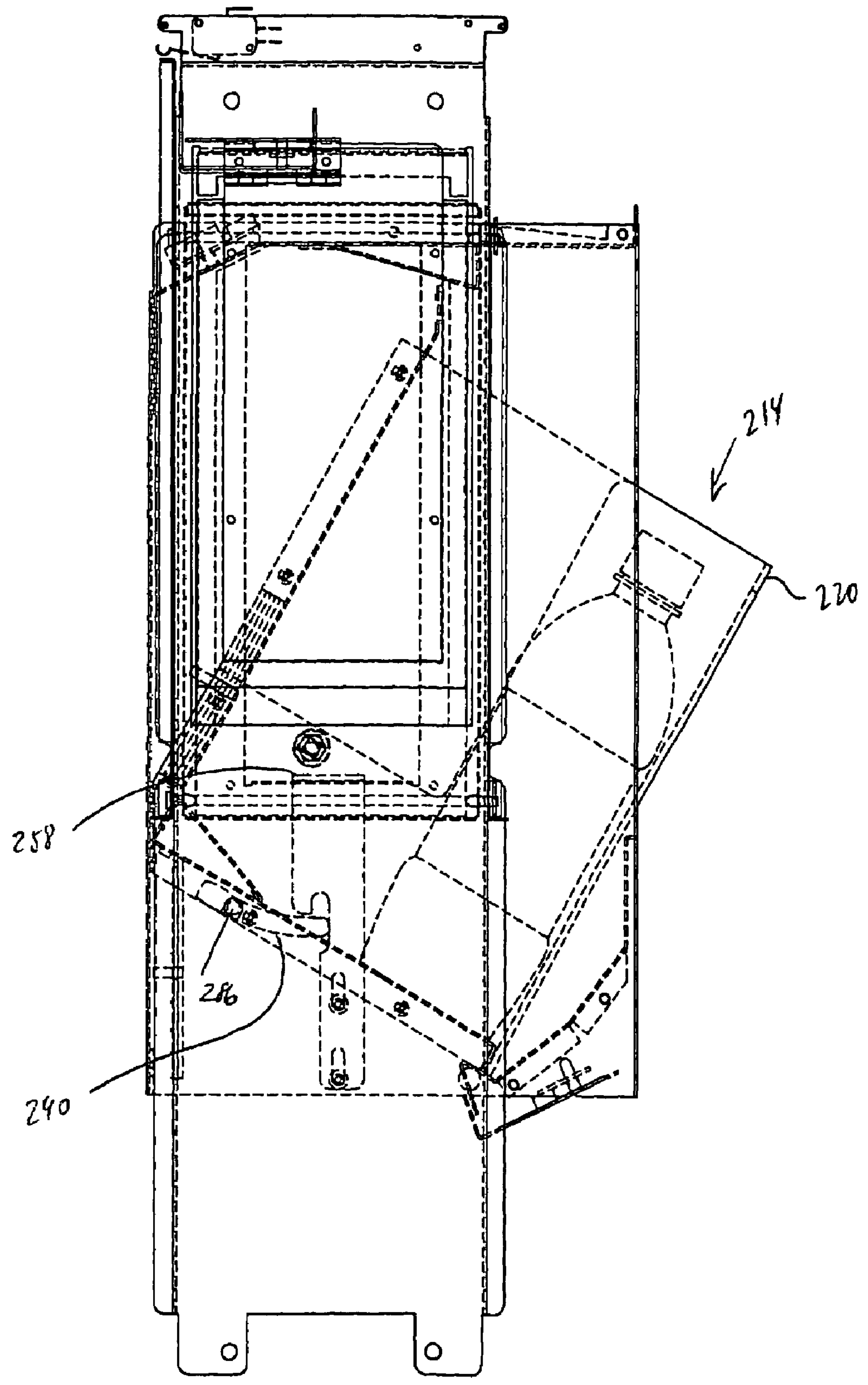
FIG. 32 is a side view of the delivery box pivoted forward to allow release of the product to the consumer.

As shown in FIG. 31, the bottle 250 is located within the delivery box 214 so that, as shown in FIG. 32, after upward movement of the door 214, the weld pin 286 is released from the port latch 258 and is allowed to travel along arcuate guide groove 290 for controlling the pivotal movement of the delivery box. The weight of the product being vended rotates the delivery box forward to present the product to the customer.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. A product separation and selection tray system for a vending machine, said product separation and selection tray system comprising a tray for holding two columns of product to be mounted on a shelf in the vending machine, a central wall for separating the two columns of product on opposite sides of the wall, a rotator pivotally mounted on the tray for controlling release of a product from the tray, a gate pivotally mounted on the tray for restraining a successive product located behind the product released by the rotator, wherein the gate is located in the central wall, and a lever projecting from the tray for engagement by a product acquisition device, said lever controlling simultaneous movement of the rotator and the gate for dispersing product from the tray to the product acquisition device.

2. The product separation and selection tray system as claimed in claim 1, wherein two sidewalls mounted on the tray are located on opposite sides of the central wall.

3. The product separation and selection tray system as claimed in claim 2, wherein the two sidewalls are laterally adjustable towards and away from the central wall so as to accommodate different sized products.

4. The product separation and selection tray system as claimed in claim 1, wherein a push bar slides on the tray to move product along the tray towards the lever.

5. The product separation and selection tray system as claimed in claim 4, wherein a spring biases the push bar.

6. The product separation and selection tray system as claimed in claim 5, wherein there are two push bars.

7. The product separation and selection tray system as claimed in claim 1, wherein the lever is movable with respect to the tray.

8. The product separation and selection tray system as claimed in claim 7, wherein the rotator and the gate are connected to the lever.

9. The product separation and selection tray system as claimed in claim 8, wherein the rotator and the gate are connected to the lever so that the rotator and the gate move in opposite directions when the lever is engaged by the product acquisition device.

10. The product separation and selection tray system as claimed in claim 1, wherein the rotator is located on the tray between an end of the lever and the gate.

11. The product separation and selection tray system as claimed in claim 1, wherein the gate includes two ends, one end of the gate is pivotally mounted on the tray and the other end of the gate is movable by the lever.

12. A product separation and selection tray system for a vending machine, said product separation and selection tray system comprising:

a tray for holding two columns of product to be mounted on a shelf in the vending machine, a central wall for separating the two columns of product on opposite sides of the wall, a rotator pivotally mounted on the tray for controlling release of a product from the tray, a gate pivotally mounted on the tray for restraining a successive product located behind the product released by the rotator, and a lever projecting from the tray for engagement by a product acquisition device, said lever controlling simultaneous movement of the rotator and the gate for dispersing product from the tray to the product acquisition device, wherein the rotator includes two flat side surfaces interconnected by a curved side surface, the curved surface is movable into and out of a path of product moving along the tray, and wherein the rotator is pivotally mounted on the tray at an intersection between the two flat surfaces with one of the flat surfaces moving in line with the central wall when the rotator is pivoted by movement of the lever.

13. A product separation and selection tray system for a vending machine, said product separation and selection tray system comprising a tray for holding two columns of product to be mounted on a shelf in the vending machine, a central wall for separating the two columns of product on opposite sides of the wall, a rotator pivotally mounted on the tray for controlling release of a product from the tray, a gate pivotally mounted on the tray for restraining a successive product located behind the product released by the rotator, a lever projecting from the tray for engagement by a product acquisition device, said lever controlling simultaneous movement of the rotator and the gate for dispersing product from the tray to the product acquisition device, and a support plate locating the lever underneath the tray and underneath the rotator and the gate.

* * * * *